(12) United States Patent
Akiyama et al.

(10) Patent No.: US 6,212,166 B1
(45) Date of Patent: *Apr. 3, 2001

(54) DATA DISTRIBUTION METHOD AND DATA DISTRIBUTION APPARATUS

(75) Inventors: Koji Akiyama; Kouichi Tanaka, both of Tokyo; Shojiro Nakahara, Kanagawa, all of (JP)

(73) Assignees: D.D.Network Limited, Kanagawa; Mitsubishi Denki Kabushiki Kaisha, Tokyo, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/898,859

(22) Filed: Jul. 25, 1997

(30) Foreign Application Priority Data

Jan. 29, 1997 (JP) ................................................ 9-015750

(51) Int. Cl.[7] ............................................................ H04L 1/16
(52) U.S. Cl. ................................................ 370/236; 710/29
(58) Field of Search ................................ 455/12.1, 13.1; 370/312, 315, 319, 330, 346, 342, 432, 236, 349, 395, 428; 371/32, 33, 34, 35, 30; 714/748, 749, 750; 710/29

(56) References Cited

U.S. PATENT DOCUMENTS

| | | |
|---|---|---|
| 4,793,813 | 12/1988 | Bitzer et al. |
| 5,003,534 * | 3/1991 | Gerhardt et al. ............. 370/322 |
| 5,121,387 | 6/1992 | Gerhardt et al. ............. 370/322 |
| 5,343,475 * | 8/1994 | Matsuda et al. ............. 370/432 |
| 5,553,083 | 9/1996 | Miller ......................... 714/748 |
| 5,623,602 * | 4/1997 | Wakashima .............. 395/200.13 |
| 5,701,311 * | 12/1997 | Kapoor ......................... 371/21 |
| 5,717,689 * | 2/1998 | Ayanoglu ..................... 370/349 |
| 5,745,685 * | 4/1998 | Kirchner et al. ......... 395/200.14 |
| 5,757,790 * | 5/1998 | Taketsugu .................... 370/342 |
| 5,841,550 * | 11/1998 | Johnson ....................... 358/402 |

FOREIGN PATENT DOCUMENTS

| | | |
|---|---|---|
| 0654921A1 | 5/1995 | (EP) . |
| 0746119A2 | 12/1996 | (EP) . |
| 61245638 | 10/1986 | (JP) . |
| 07015525 | 1/1995 | (JP) . |
| 9621184 | 8/1996 | (WO) . |

OTHER PUBLICATIONS

Jones, Mark G. W. et al., "Protocol Design for Large Group Multicasting; the Message Distribution Protocol" 8260 Computer 14 (1991) Jun., No. 5, London, GB, pp. 287–297 XP000208347.

Waters, A. G. et al., "Broadcast File Distrubution Protocols for Satellite Networks" vol., CONF. 2, 1989, pp. 133–138, XP000041181.

* cited by examiner

Primary Examiner—Douglas W. Olms
Assistant Examiner—Ken Vanderpuye

(57) ABSTRACT

A data distribution method and apparatus have a satellite communication line (5) for transmitting data to a receiver and a ground line (10) for transmitting a data distribution request and a transmission confirmation pattern to a transmitter, a transmission confirmation designation device (11) in the transmitter for designating the transmission confirmation pattern, and a transmission confirmation processing device (12) for performing the transmission confirmation process according to a transmission confirmation method indicated by the transmitter.

20 Claims, 19 Drawing Sheets

DATA DISTRIBUTION METHOD AND DATA DISTRIBUTION APPARATUS

BACKGROUND OF THE INVENTION

1. Field of the Invention

The present invention relates to a data distribution method and a data distribution apparatus for distributing various different types of data items through a plurality of communication lines or networks such as satellite lines, ground wire lines, and the like.

2. Description of the Related Art

FIG. 25 is a diagram showing the configuration of a conventional data distribution apparatus that has been disclosed in Japanese laid-open publication number JP-A-7/143181. This conventional data distribution apparatus comprising a connection device 103 in a transmitter and a connection device in a receiver for selecting one of a digital communication satellite 101 and a digital ground line 102 according to predetermined conditions such as the amount of transmission data to be transmitted, connection types such as a broadcast communication and a one to one point communication, and a traffic of a line. The connection devices 103 and 104 in the transmitter and the receiver are used as network connection apparatus placed between a digital communication satellite as a digital transmission path to connect private networks and a digital ground network, and the private networks.

The connection device 103 (a central station GW) in the transmitter is connected to the private network 106 (a central station LAN) that is connected to a large-volume information storage source 105 such as a digital video server 105 and the like. On the other hand, each of the connection devices 104 in a receiver (branch GW) is connected to a video terminal 108 through each branch private network 107. A video information broadcasting is performed from the connection device 103 in a transmitter to the connection device 104 in a receiver. In addition, a digital ground line or network connects the connection device in the transmitter 103 to the connection device 104 in a receiver. It is thereby possible to transmit control information and the like between them in two-way transmission.

FIG. 26 is a diagram showing a conventional process flow of a general transmission confirmation pattern. In the conventional transmission confirmation pattern, the transmission confirmation is performed on every receiving of a distribution data item. That is, the number of the distribution data items is equal to the number of the transmission confirmations. The timing to transfer the transmission confirmation is a time when the distribution data item is received.

FIG. 27 is a diagram showing a concept of a general configuration of a data communication system and a data process flow in which a receiver receives a data item and transmits a transmission confirmation to a transmitter (not shown). In the conventional data distribution system shown in FIG. 27, the control device 110 in a receiver receives a distribution data item through the satellite line 113 and then transfers this data item to the receive device 112 connected through the LAN 111. The receive device 112 transmits the transmission confirmation to the transmitter (not shown).

There are following prior art techniques (1) to (11) (relating to the above data distribution technique).

(1) Japanese laid-open publication number JP-A-62/189823 shows a technique in which a ground line and a satellite line are switched according to the state of those lines, and the configuration and the length of transmission data. This technique uses a two-way satellite line. There is therefore a drawback in that it is nessary to place a satellite receiver having a highly installation cost at every required point.

(2) Japanese laid-open publication number JP-A-2/16847 shows a method to designate a requirement of a transmission confirmation when a receiver requests a data transmission to a transmitter. However, this technique is limited only to a PULL type data distribution in which the request transmitted from the receiver becomes a trigger. That is, this technique cannot be applied to a PUSH type data distribution caused by the transmitter. There is therefore a drawback that it is difficult to designate a transmission confirmation in the PUSH type data distribution.

(3) Japanese laid-open publication number JP-A-4/367135 shows a technique in which the load required for the processing of affirmation response is reduced by grouping a plurality of affirmation requests into one frame and transmitting it. However, there is a drawback that it takes many clock times to make the frame and to analyze the frame when the number of the affirmation requests is small and when a plurality of affirmation requests do not happened simultaneously. In addition to this drawback, there is a drawback in that processing must wait until a plurality of affirmation requests are generated in order to group them into one frame. Therefore this technique can not be applied to a data distribution to be executed at a high speed.

(4) Japanese laid-open publication number JP-A-4/207430 shows a method in which a transmitter divides a file into a plurality of sub-files and the transmission confirmation is performed only when the all sub-files have been transmitted to a receiver. This means that a transmission affirmation is performed after all of the original file (not every a divided sub-file) to be distributed in the transmitter is recieved. Therefore there is a drawback that the load of the transmitter becomes large when the number of distribution files or the number of receivers is increased, because the number of-transmission affirmations received by the transmitter becomes a value of (the number of transmitted files)×(the number of receivers).

(5) Japanese laid-open publication number JP-A-63/276928 shows a time division transmission point reservation method in which a shared transmission path is used as a transmission confirmation process during a desired time period. Because this conventional technique exclusively uses the transmission path during the desired time period, there is a drawback that it is difficult to use the transmission path for urgent transmission during this time period (6) Japanese laid-open publication number JP-A-60/24749 shows a transmission confirmation method in which a transmission confirmation transferred from a relay node is canceled and, only a transmission confirmation and a re-transmission request transmitted from a receiver are accepted by a transmitter in a data communication system having relay nodes. This causes an increase load on the relay node because the relay node performs a transmission confirmation operation having no meaning.

(7) Japanese laid-open publication number JP-A-62/299142 shows a transmission confirmation method in which a control host in a receiver performs a transmission confirmation without waiting to receive a transmission confirmation transferred from the host in the receiver. Therefore there is a drawback that there is no consideration when the host in the receiver fails to receive the data. In addition to this drawback, there is no control meaning in transmitting the transmission confirmation data item from the host in the receiver to the receiver control host.

(8) Japanese laid-open publication number JP-A-62/189823 further shows a line combination communication method in which a target line to be used is selected according to a configuration of data, a size, a traffic state of a line and the like. However, it is not decided how to set and to use a threshold value of a data size when a current channel is switched in this method. Further, this method has a drawback that a distribution packet number per time is fixed and only a static time T="td"דtx" is considered, where "td" is a time required for switching, and "tx" is a satellite delay time. Although the state of data communication using satellite lines is influenced by weather conditions, this method has a drawback in which there is no consideration for un-reached packet and transmission delay.

(9) Japanese laid-open publication number JP-A-62/285529 shows a satellite communication method of distributing small sized data through ground lines and of transmitting large volume data by satellite lines after data is divided into two groups such as the small sized data group and the large sized data group. However, this method involves a drawback in which it is not considered to transmit a plurality of small sized data items such as "WWW" data in parallel, because a general data item must be a large sized volume and a control data item must be a small sized data item in this method.

(10) Japanese laid-open publication number JP-A-3/195234 shows a packet exchange method in which a most suitable ground line is selected and used when a current satellite line has a malfunction. This method involves a drawback in which traffic on the ground line to transfer data becomes heavy when the number of un-completed transmission packets is increased, because the packet data item with regard to the un-completed transmission packet is returned to a control device in a transmitter.

(11) Japanese laid-open publication number JP-A-3/195234 shows a method in which the number of distribution data items that were not distributed correctly is counted, and a data transmission time to a receiver is controlled according to this counted number. However, this method involves a drawback in which a load of a network is increased because a re-transmission operation is executed on every occurrence of a packet transmission failure.

Because the conventional data distribution apparatus and methods have the configuration described above, following drawbacks (12) to (20) are caused:

(12) In general, although the most suitable transmission confirmation pattern is changed according to a change in distribution conditions such as the number of receivers, a receive data buffer size of the receiver and the like, there is no method to solve the above problems.

(13) Although the most suitable transmission confirmation pattern is also changed in the same receiver according to a change of the distribution conditions described above, there is no technique to match the change of the distribution conditions.

(14) Furthermore, the transmission confirmation pattern described above is transmitted every transmission in one-to-one correspondence. That is, when the data transmission distribution is performed two times, the transmission confirmation is also transferred two times. Accordingly, many data transmissions must be performed, the receiver must transfer the transmission confirmations whose number is equal to the number of distribution files in the data transmissions. This causes an increase in the load of receiver.

(15) Moreover, when a transmission station broadcasts data to receivers, the transmission station must receive the transmission confirmations, whose number is equal to the number of the receivers, transmitted from the receivers, simultaneously. In this case, when the number of the receivers is increased, the number of the transmission confirmations to be received simultaneously is also increased. This causes an increase in the load of the transmission station.

(16) Further, in a case that a receive station comprises a receive control device and receivers connected to the receive control device through a Local Area Network (LAN), the receiver generates a transmission confirmation and sends it to a transmitter and it is difficult to change the above receivers function. Therefore there is a drawback that the receiver performs the transmission confirmation operation even if the load of the receiver is heavy.

(17) In addition, there is a drawback that the use of a satellite line for the transmission of a small-sized data becomes uneconomical in performance and maintenance cost. Because the technique, disclosed in the Japanese laid-open publication number JP-A-7/143181 that has been prescribed, uses a N-ISDN line as a wire line, the maintenance cost or the operating costs of them becomes very high.

(18) Furthermore, there is a drawback in which a transmission distribution is executed again after a line is restored to normal conditions when the line is down by a failure of a relay device and the like.

(19) Moreover, there is no advantage to use a satellite line and a ground line that are capable of transmitting data with a high speed when a plurality of small sized data items are transmitted simultaneously.

(20) Finally, when a packet transmission has failed, a re-transmission for this failed packet must be executed by interrupting the current packet transmission. Therefore there is a drawback in which the transmission efficiency of a transmitter becomes low because a transmission for a current packet must be interrupted during a required time period in order to perform the re-transmission for the failed packet. Then the current packet transmission will be re-started after every occurrence of a packet failure.

SUMMARY OF THE INVENTION

Accordingly, an object of the present invention is, with due consideration to the drawbacks of the conventional data distribution methods and the conventional data distribution apparatus, to provide a data distribution method and a data distribution apparatus that are capable of executing a transmission confirmation to indicate whether or not a data distribution has been completed correctly by using the most suitable method according to conditions or situations.

Another object of the present invention is to provide a data distribution method and a data distribution apparatus that is capable of performing a data distribution efficiently by automatically selecting the most suitable line in satellite lines and wire lines according to kinds of distributed data items and data distribution conditions.

Another object of the present invention is to provide a data distribution method and a data distribution apparatus that is capable of performing a data distribution at high efficiency.

In accordance with a preferred embodiment of the present invention, a data distribution method for performing data distribution between a transmitter and a receiver through wire lines and satellite communication lines, comprising the steps of, checking to determine if there is a presence or an absence of a request for a data transmission confirmation, and designating a data transmission confirmation pattern by the transmitter, and outputting a transmission confirmation from the receiver to the transmitter according to the presence or the absence of the data transmission confirmation and a content of the transmission confirmation pattern that have been received by the receiver.

In the data distribution method as another preferred embodiment according to the present invention, the presence or the absence of the request of the data transmission confirmation is checked, and the data transmission confirmation pattern is designated by both the transmitter and the receiver, and the transmission confirmation is output from the receiver to the transmitter according to the presence or the absence of the request for the data transmission confirmation and the content of the transmission confirmation pattern that have been received by the receiver.

In the data distribution method as another preferred embodiment according to the present invention, the presence or the absence for the request of the data transmission confirmation is checked by the transmitter, the data transmission confirmation pattern is designated by the transmitter, an available line to be used for the data distribution is selected by the transmitter, and the data distribution is performed from the transmitter to the receiver through the selected available line, and the transmission confirmation is output from the receiver to the transmitter according to the presence or the absence of the request of the data transmission confirmation and the content of the transmission confirmation pattern that have been received by the receiver.

In the data distribution method as another preferred embodiment according to the present invention, the presence or the absence of the request for the data transmission confirmation is checked by the transmitter, the data transmission confirmation pattern is designated by the transmitter, and a data transmission type in which the transmission confirmation pattern and a transmission request data are grouped or not in the data distribution is designated by the transmitter, and the transmission confirmation is output from the receiver to the transmitter according to the presence or the absence of the request for the data transmission confirmation and the content of the transmission confirmation pattern that have been received by the receiver.

In accordance with another preferred embodiment of the present invention, a data distribution apparatus for transmitting data between a transmitter and a receiver, comprising a transmission line device for receiving a distribution request of data in the transmitter, a memory device in the transmitter for storing the data, a control device in the transmitter for reading the data stored in the memory device and for controlling a data distribution operation to transmit the data to the receiver, a satellite transmission device for transmitting the data controlled by the data distribution operation executed by the control device through radio waves, a satellite relay device for relaying the radio waves, a satellite receive device for receiving the radio waves, a control device in the receiver for receiving the radio waves received by the satellite receive device, a line device in the receiver, connected to the line device in the transmitter through a wire line, for transmitting a request and data to the transmitter, a transmission confirmation designation device in the receiver for designating a transmission confirmation pattern as the request, and a transmission confirmation processing device in the receiver for receiving the content of the transmission confirmation type and for performing a transmission confirmation operation to the transmitter.

In the data distribution apparatus as another preferred embodiment according to the present invention, the apparatus further comprises a transmission confirmation designation device in the receiver for designating the transmission confirmation pattern.

In the data distribution apparatus as another preferred embodiment according to the present invention, the transmission confirmation processing device in the receiver transmits, to the control device in the transmitter, a transmission confirmation for a group of distribution data items which have been received during a predetermined time period counted from a time when the control device in the receiver receives the distribution data item transmitted from the transmitter, according to the request by the transmitter or the receiver.

In the data distribution apparatus as another preferred embodiment according to the present invention, the transmission confirmation processing device in the receiver transmits, to the control device in the transmitter, a transmission confirmation of the received distribution data item at a random time in a predetermined time period counted after a time when the control device in the receiver receives the distribution data item transmitted from the transmitter, according to the request by the transmitter or the receiver.

In the data distribution apparatus as another preferred embodiment according to the present invention, the transmission confirmation processing device in the receiver transmits, to the control device in the transmitter, a transmission confirmation after receiving a constant byte length of the received distribution data items after a time when the control device in the receiver receives the distribution data item transmitted from the transmitter, according to the request by the transmitter or the receiver.

In the data distribution apparatus as another preferred embodiment according to the present invention, the transmission confirmation processing device in the receiver transmits, to the control device in the transmitter, a transmission confirmation after receiving the predetermined constant number of files as the distribution data items after a time when the control device in the receiver receives the distribution data item transmitted from the transmitter, according to the request by the transmitter or the receiver.

In the data distribution apparatus as another preferred embodiment according to the present invention, the transmission confirmation processing device in the receiver receives a transmission time of the transmission confirmation indicated by the control device in the transmitter, and transmits the transmission confirmation of the data distribution at the indicated transmission time to the control device in the transmitter according to the request by the transmitter or the receiver.

In the data distribution apparatus as another preferred embodiment according to the present invention, the transmission confirmation processing device in the receiver receives, through the control device in the receiver, information for a transmission confirmation sending device to indicate a specific device for transmitting the transmission confirmation, that is designated by the control device in the transmitter or in the receiver and then received by the control device in the transmitter, and the transmission confirmation processing device in the receiver transmits the information of the designated transmission confirmation sending device.

In the data distribution apparatus as another preferred embodiment according to the present invention, the control device in the transmitter is capable of designating a transmission stage to transmit the transmission confirmation or is capable of transmitting information designating a transmission stage to transmit the transmission confirmation to the control device in the receiver, and the control device in the receiver is capable of receiving the transmission information indicating the transmission stage, and is capable of transmitting a transmission confirmation sending instruction based on the received transmission information to the control device itself in the receiver or to another receive device connected through a Local Area Network in the receiver.

In the data distribution apparatus as another preferred embodiment according to the present invention, the apparatus further comprises a router device in the transmitter for connecting the control device in the transmitter and the satellite transmission device and for transferring the data transferred from the control device in the transmitter to the satellite transmission device, and a router device in the receiver for connecting the satellite receive device to the control device in the receiver and for transmitting the received data to the control device in the receiver. In the apparatus, the data distribution request transferred from the control device in the receiver is transmitted to the line device in the transmitter through the line device in the receiver, and the control device in the transmitter receives the data distribution request, for reading the distribution data stored in the memory device in the transmitter, and for transmitting the distribution data to the router devices in the transmitter and the receiver according to the request data.

In the data distribution apparatus as another preferred embodiment according to the present invention, the apparatus further comprises an available line selection device in the transmitter for checking a volume or size of the distribution data to be transmitted and for selecting one of the wire line and the satellite line automatically according to the size of the distribution data.

In the data distribution apparatus as another preferred embodiment according to the present invention, the available line selection device is capable of checking a state of a current line during transmitting of the data distribution from the control device in the transmitter to the receiver, for switching the current line through which the data distribution is executing to another available line to be used, for transmitting information about the switched line to the control device in the receiver, and the control device in the receiver is capable of receiving the information about the change of the switched line, and for switching a data receiving line according to the received information about the change of the switched line.

In the data distribution apparatus as another preferred embodiment according to the present invention, the apparatus further comprises a router device in the transmitter for connecting the control device in the transmitter and the satellite transmission device and for transferring the data transferred from the control device in the transmitter to the satellite transmission device, and a router device in the receiver for connecting the satellite receive device to the control device in the receiver and for transmitting the received data to the control device in the receiver, In the data distribution apparatus as another preferred embodiment according to the present invention, the apparatus further comprises a transmission type designation device in the transmitter for receiving the distribution data and for selecting one of following distribution methods (a) and (b): (a) A plurality of distribution data items according to the data distribution request and other data distribution requests are grouped and the grouped data items are transmitted at a time to the receiver; and (b) The distribution data is transmitted to the receiver after every receiving of each distribution data request.

In the data distribution apparatus as another preferred embodiment according to the present invention, the transmission type selection device in the transmitter is capable of receiving information about a packet transmission success/failure transmitted from the receiver, capable of storing a failure packet number about the packet in the transmission failure, capable of detecting the completion of the packet transmission and of re-transmitting the packets in the transmission failure, and the control device in the receiver is capable of receiving the failure packet transmitted from the transmitter and capable of generating a file based on the received re-transmitted failure packet, and the transmission type selection device in the transmitter groups a plurality of failure packets and re-transmits them after the completion of the normal packet transmission.

In the data distribution apparatus as another preferred embodiment according to the present invention, the apparatus further comprises a router device in the transmitter for connecting the control device in the transmitter and the satellite transmission device and for transferring the data transferred from the control device in the transmitter to the satellite transmission device, and a router device in the receiver for connecting the satellite receive device to the control device in the receiver and for transmitting the received data to the control device in the receiver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Other features of this invention will become apparent through the following description of preferred embodiments which are given for illustration of the invention and are not intended to be limiting thereof.

Preferred embodiments of a data distribution method and a data distribution apparatus according to the present invention will now be described with reference to the drawings.

First Embodiment

Figure 1:
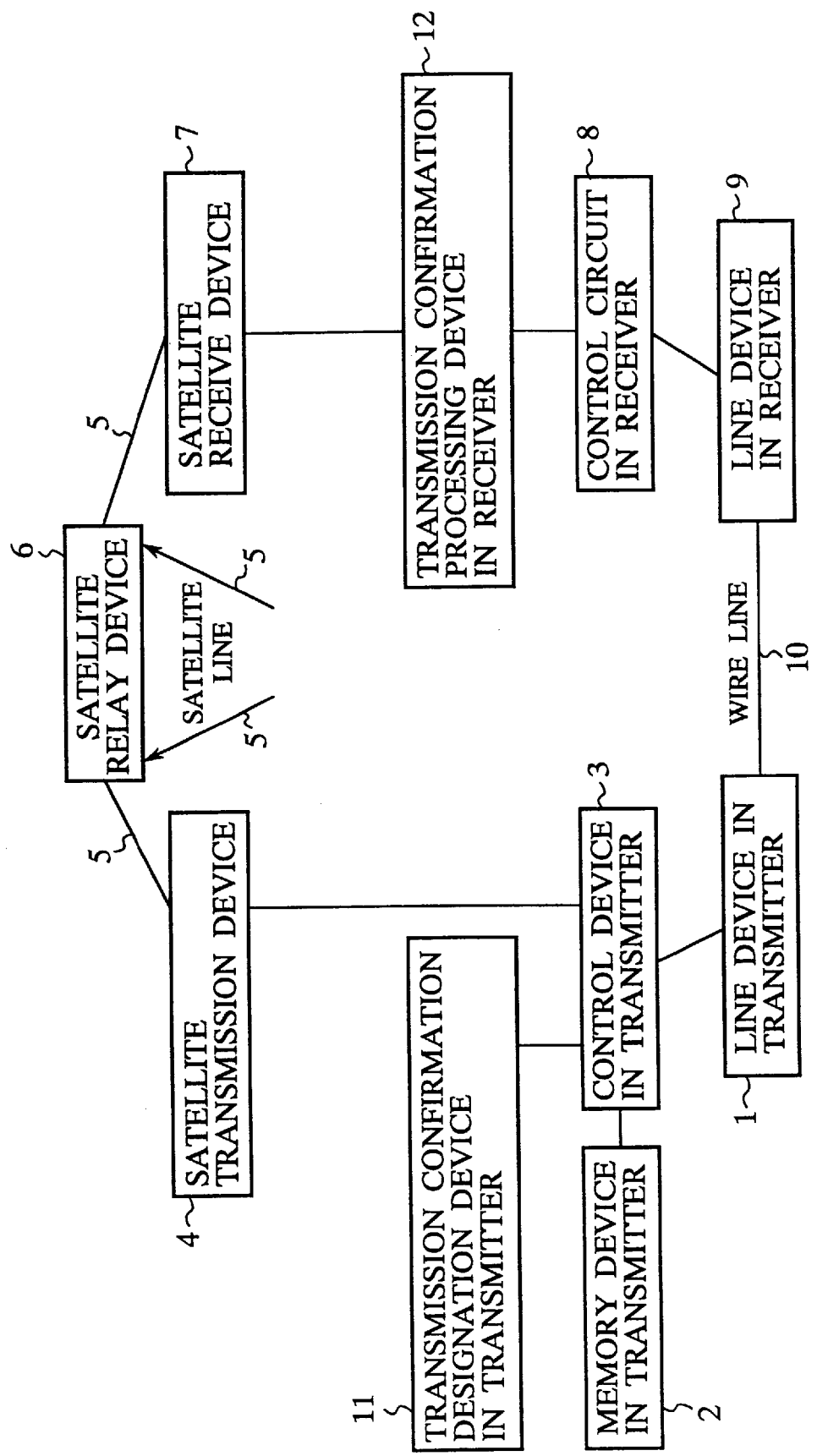
FIG. 1 is a diagram showing a configuration of a data distribution apparatus according to the first embodiment of the present invention.

FIG. 1 is a diagram showing the configuration of a data distribution apparatus according to the first embodiment of the present invention. In FIG. 1, the reference number 1 designates a line device in a transmitter for receiving a data distribution request generated by and transferred from receivers, 2 denotes a memory device in the transmitter for storing distribution data, 3 indicates a control device in the transmitter for reading out the distribution data stored in the memory device 2 and for processing a data transmission of the distribution data. The reference number 4 designates a satellite transmission device for transmitting data to a satellite line 5, 6 denotes a satellite rely device used for relaying the satellite line 5 between the transmitter and the receivers. The reference number 7 designates a satellite receive device used for receiving radio waves as the data on the satellite line 5. The reference number 8 designates a control device in the receiver for using the data received by the satellite receive device 7, and 9 denotes a line device in the receiver, connected to the line device 1 in the transmitter through a wire line or a ground wire line 10, for transferring data required by the control device 8 in the receiver to the line device 1 in the transmitter. The reference number 11 indicates a transmission confirmation designation device in the transmitter for designating a transmission confirmation pattern, and the reference number 12 indicates a transmission confirmation processing device in the receiver for receiving the content of the transmission confirmation transferred from the transmission confirmation designation device 11 in the transmitter and for executing the content of the transmission confirmation.

Next, a description will now be given of the operation of the data distribution apparatus of the first embodiment shown in FIG. 1.

First, a data distribution request of data to be required by the control device 8 in the receiver is transmitted to the line device 1 in the transmitter through the line device 9 in the receiver and the ground wire line 10. The line device 1 in the transmitter receives the data distribution request and the control device 3 in the transmitter receives the data distribution request and then reads data stored in the memory device 2 according to the data distribution request and then transmits the data to the satellite transmission device 4.

The satellite transmission device 4 converts the data and transfers the converted data to the satellite relay device 6. The satellite relay device 6 relays the satellite line 5. On the other hand, the satellite receive device 7 receives the data through the satellite line 5. The control device 8 in the receiver uses the data received by the satellite receive device 7.

Next, the operations of the transmission confirmation designation devices 11 and 12 in the transmitter and the receiver during the data distribution operation described above will now be explained with reference to FIG. 2.

Figure 2:
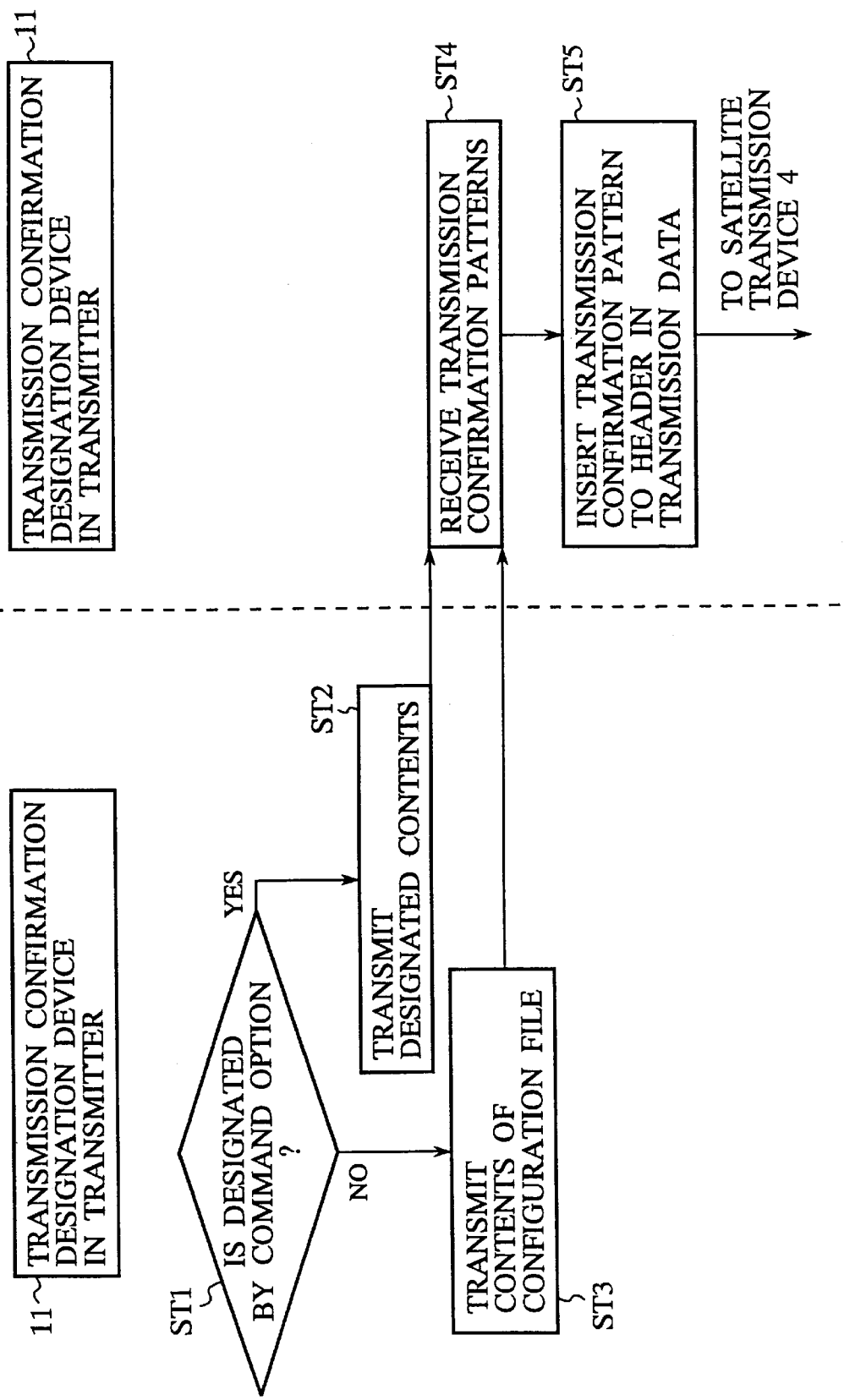
FIG. 2 is a diagram showing an algorithm or a process flow chart of a data transmission operation performed by the data distribution apparatus according to the first embodiment of the present invention shown in FIG. 1.

FIG. 2 is a diagram showing an algorithm for a data transmission confirmation pattern designation operation executed by the data distribution apparatus according to the first embodiment of the present invention shown in FIG. 1. When a distribution command is activated, the transmission confirmation designation device 11 in the transmitter checks whether or not a transmission confirmation pattern is designated in a command option of the command (Step ST11).

When it is designated by the command option (YES), the content of the transmission confirmation pattern is transferred to the control device in the transmitter (Step ST2). On the other hand, when it is not designated by the command option (NO), the content of the transmission confirmation pattern described in the configuration file in the transmitter is transferred to the control device 3 in the transmitter (Step ST3). The control device 3 in the transmitter combines the received contents and the distribution data and transfers the combined one to the satellite transmission device 4 in the transmitter (Steps ST4 and ST5).

Figure 3:
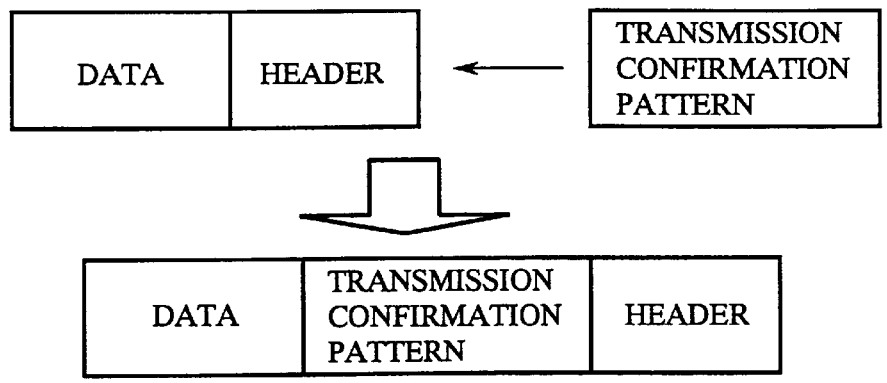
FIG. 3 is a diagram showing a model in which a transmission confirmation pattern is inserted into a distribution data item performed in the first embodiment of the present invention.

FIG. 3 is a diagram showing a model in which the transmission confirmation pattern is inserted into the distribution data in the first embodiment of the present invention.

Figure 4:
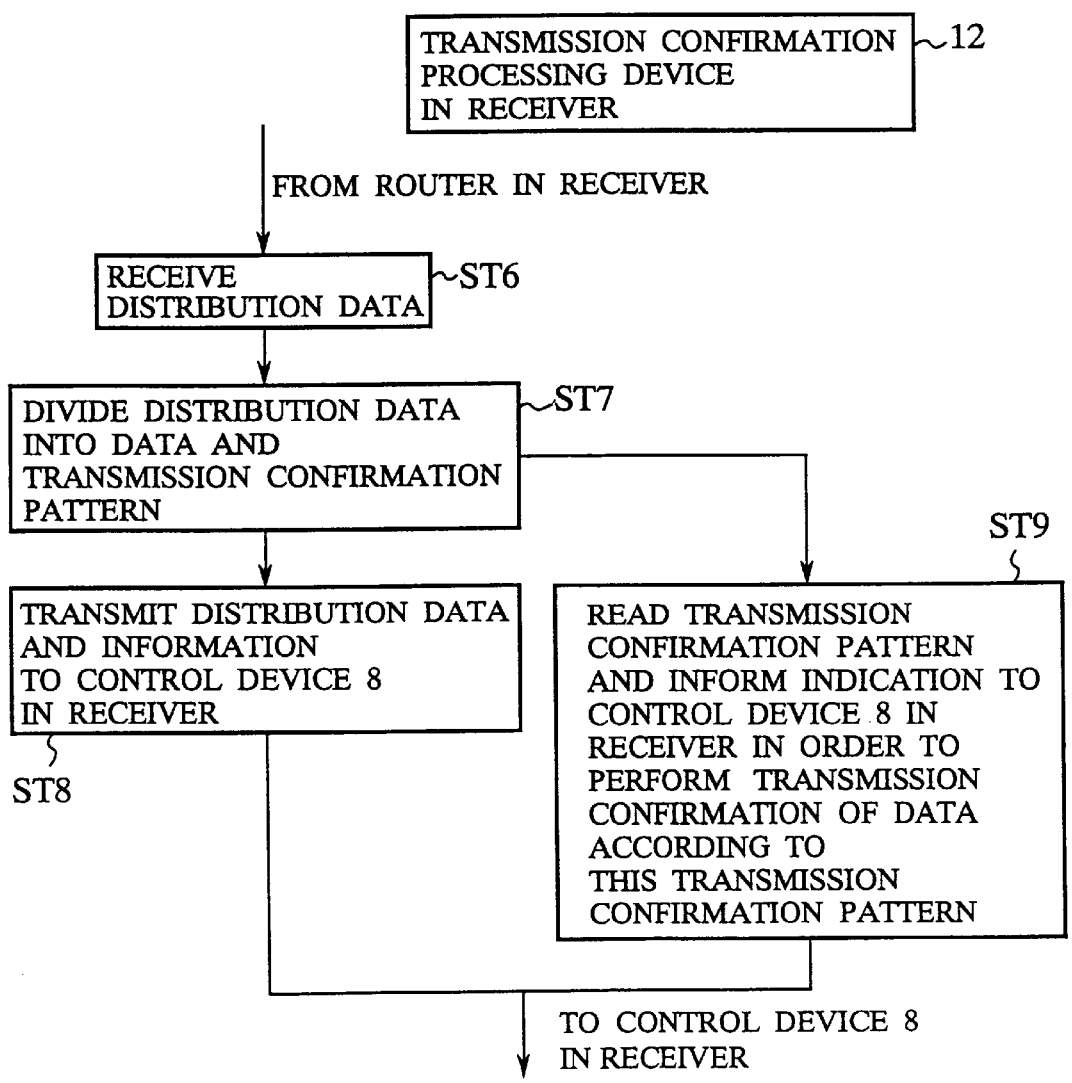
FIG. 4 is a diagram showing a data receiving operation of a receiver executed by the data distribution apparatus according to the first embodiment of the present invention shown in FIG. 1.

FIG. 4 is a diagram showing an algorithm of a data receiving operation of the transmission confirmation processing device 12 in the receiver in the data distribution apparatus according to the first embodiment of the present invention shown in FIG. 1.

The transmission confirmation processing device 12 in the receiver receives the distribution data item transferred from the satellite receive device 7 (Step ST6) and divides the received distribution data item into a data part and a transmission confirmation part (Step ST7) and transfers this data section to the control device 8 in the receiver (Step ST8). At the same time, the transmission confirmation processing device 12 reads the content of the transmission confirmation part and transfers information to the control device 8 so that the control device 8 will perform the transmission confirmation according to the content of the transmission confirmation part (Step ST9). Then, the control device 8 issues a transmission confirmation based on the content of the transmission confirmation part.

In the explanation of the first embodiment described above, the data transmission request from only one control device 8 in the receiver is described, but the present invention is not limited by this case, the present invention can be applied to various cases. For example, it is acceptable that one or more receivers transmit data transmission requests to the transmitter simultaneously, and that a plurality of data items are requested from one receiver or a plurality of the receivers to the transmitter.

Second Embodiment

Figure 5:
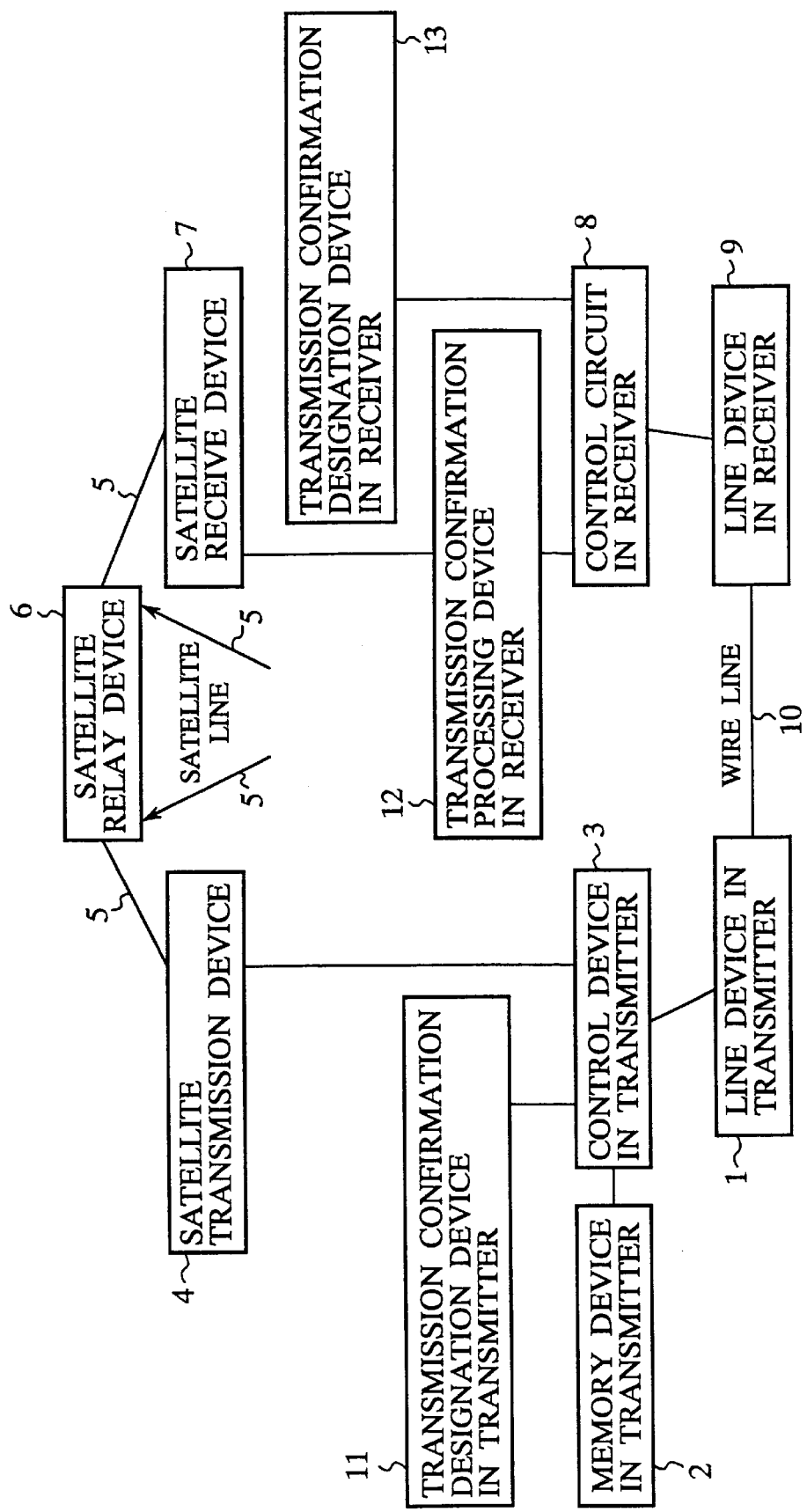
FIG. 5 is a diagram showing a configuration of a data distribution apparatus according to the second embodiment of the present invention.

FIG. 5 is a diagram showing the configuration of a data distribution apparatus according to the second embodiment of the present invention. In FIG. 5, the reference number 13 indicates a transmission confirmation designation device in the receiver. Other components used in the data distribution apparatus of the second embodiment are the same as those in the first embodiment, therefore, the explanation of them is omitted here and the same reference numbers are used for those components.

Figure 6:
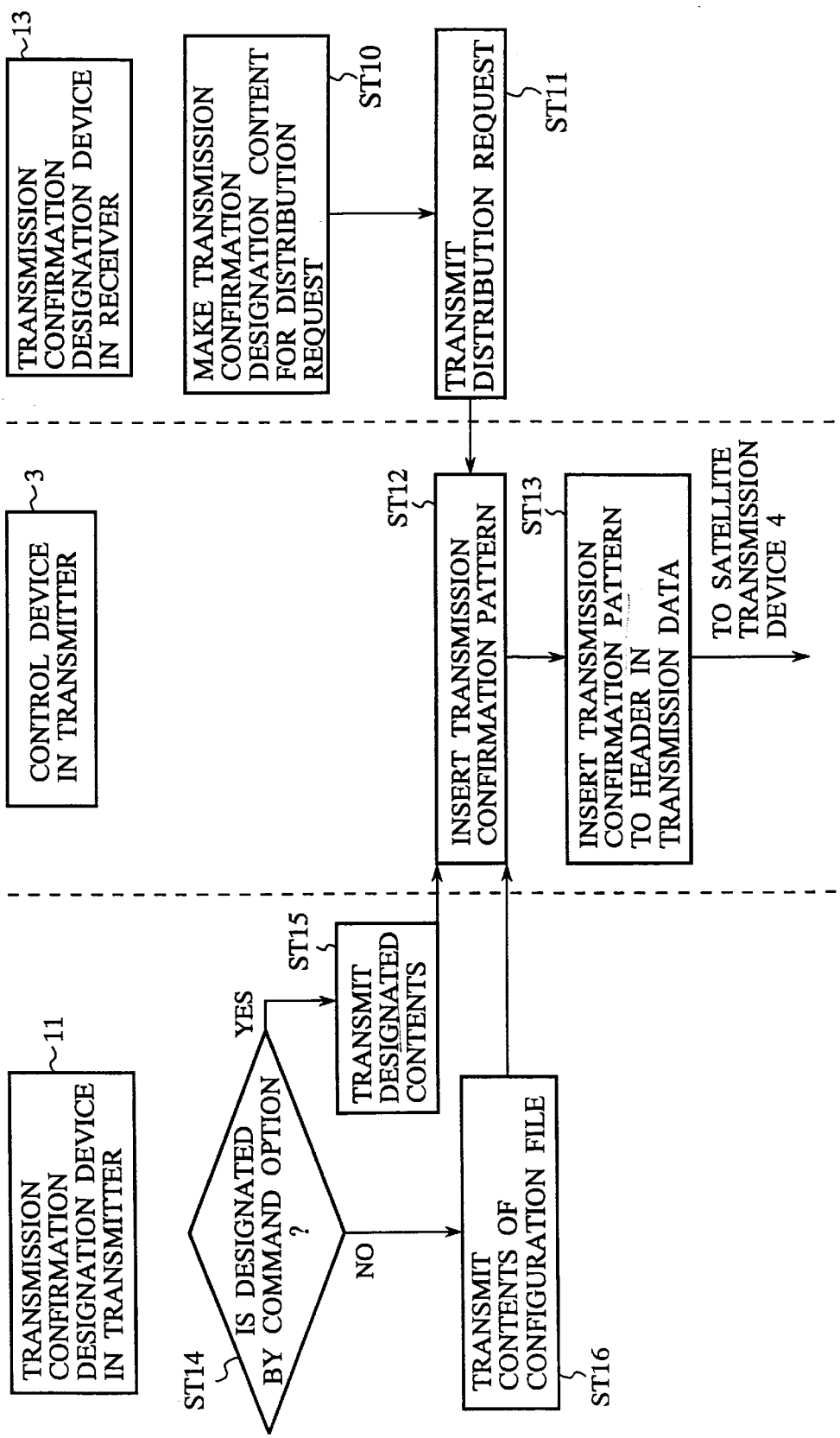
FIG. 6 is a diagram showing an algorithm of a data distribution operation in a transmitter according to the second embodiment of the present invention shown in FIG. 5.

FIG. 6 is a diagram showing an algorithm of a data distribution operation in the transmitter according to the second embodiment of the present invention shown in FIG. 5.

The operation of the transmission confirmation designation device 11 in the transmitter is executed only when the transmitter performs the data distribution operation where the receiver does not transmit a data distribution request to the transmitter (hereinafter this data distribution type will be referred to as PUSH type distribution). On the other hand, the operation of the transmission confirmation designation device 13 in the receiver is executed only when the receiver requests a data distribution to the transmitter (hereinafter this data distribution type will be referred to as PULL type distribution).

The transmission confirmation designation device 13 in the receiver transmits a transmission confirmation designation pattern to the control device 8 in the transmitter. When receiving the transmission confirmation designation pattern transferred from the transmission confirmation designation device 13, the control device 8 in the receiver makes data including the content of the transmission confirmation designation pattern and the distribution request (Step ST10), and then transfers it to the control device 3 in the transmitter through the wire line 10 (Step ST11). When receiving the data from the receiver, the control device 3 in the transmitter divides the received data into the data distribution request part and the transmission confirmation pattern part and inserts a content data item of the transmission confirmation pattern into the designated distribution data item (Steps ST12 and St13) and transfers it to the control device 8 in the receiver through the satellite line 5. The operation of the control device 8 in the receiver is the same as that of the receiver in the first embodiment, therefore the explanation of the operation of the control device 8 is omitted here for brevity.

On the other hand, when the receiver transmits no transmission confirmation pattern to the transmitter, the transmitter designates the transmission confirmation pattern according to the configuration file. This operation of the transmitter is the same as that in the first embodiment shown in FIG. 3, therefore the explanation of this operation is also omitted here for brevity.

Third Embodiment

Figure 7:
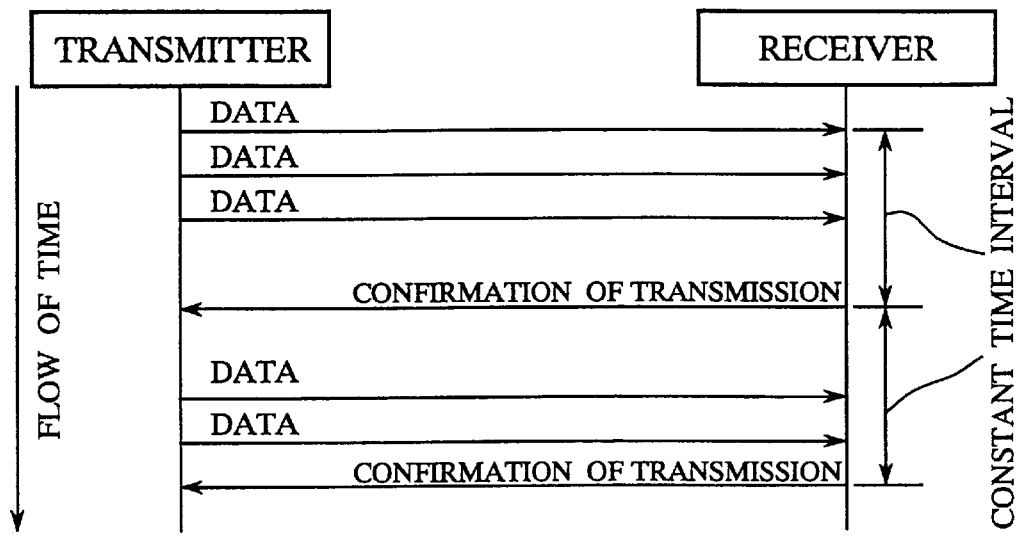
FIG. 7 is a diagram showing a model of the operation of a transmission confirmation pattern used in the third embodiment of the present invention.

FIG. 7 is a diagram showing a model of the operation of the transmission confirmation pattern used in the third embodiment of the present invention. The information included in the transmission confirmation pattern is a time as a transmission confirmation ID. As shown in FIG. 7, the receiver transfers only one transmission confirmation to the transmitter every data group, which is designated with this transmission confirmation pattern, received during the time period counted from the time when the satellite receive device 7 receives the transmission confirmation pattern at first during a predetermined time period. In addition to the above operation, the receiver also transfers only one transmission confirmation to the transmitter for a data group, which is also designated with this same transmission confirmation pattern, received after the previous transmission confirmation has been transmitted to the transmitter as the data items that have been received during the time period counted from the transmission of the previous transmission confirmation to a predetermined time period. The receiver performs these operations described above repeatedly.

Fourth Embodiment

Figure 8:
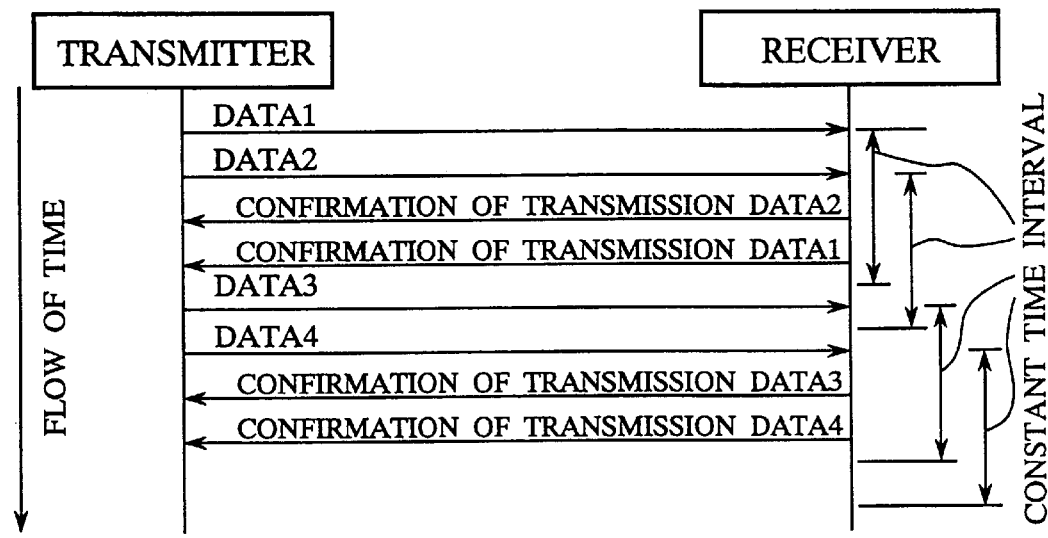
FIG. 8 is a diagram showing a model of the operation of a transmission confirmation pattern used in the fourth embodiment of the present invention.

FIG. 8 is a diagram showing a model of the operation of a transmission confirmation pattern used in the fourth embodiment of the present invention. Another model of the operation of the transmission confirmation is shown in FIG. 8. This model is different from the model of the third embodiment, as shown in FIG. 7.

In the fourth embodiment, the information included in the transmission confirmation pattern is also a time as a transmission confirmation ID. As shown in FIG. 8, the receiver transfers only one transmission confirmation at a random time during a predetermined time period to the transmitter for each data received during the time period counted from the time when the satellite receive device 7 receives the transmission confirmation pattern at first to this random time.

Similarly, the transmission confirmation of data whose transmission confirmation pattern has been designated is also transferred at a random time in the predetermined time period after the satellite receive device 7 receives the data to the transmitter.

Fifth Embodiment

Figure 9:
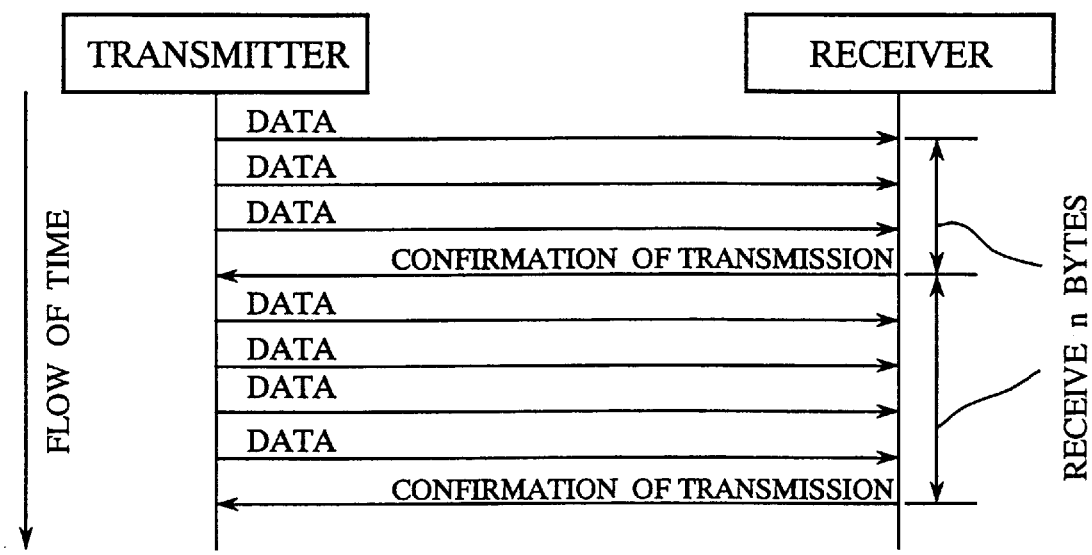
FIG. 9 is a diagram showing a model of the operation of a transmission confirmation pattern used in the fifth embodiment of the present invention.

FIG. 9 is a diagram showing a model of the operation of a transmission confirmation pattern used in the fifth embodiment of the present invention.

In the fifth embodiment, the information included in the transmission confirmation pattern is the number of bytes as a transmission confirmation ID. As shown in FIG. 9, the receiver transfers a transmission confirmation to the transmitter when data items whose byte-number is designated by the transmission confirmation pattern are received counted from the time when the satellite receive device 7 receives the transmission confirmation pattern at first. After this, this operation is repeated. That is, the receiver transfer the transmission confirmation to the transmitter repeatedly every when the satellite receive device 7 receives data items whose byte number is designated by each transmission confirmation pattern.

Sixth Embodiment

Figure 10:
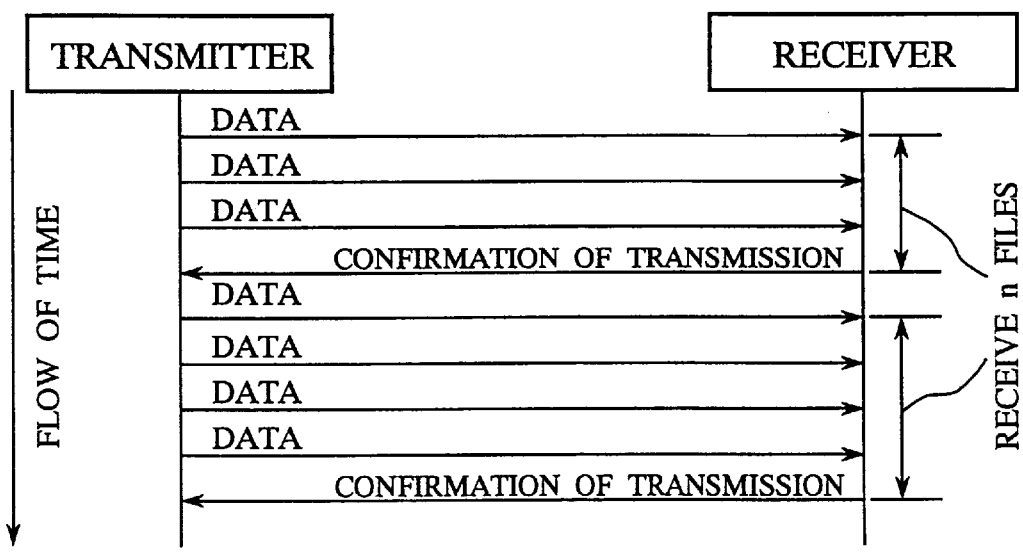
FIG. 10 is a diagram showing a model of the operation of a transmission confirmation pattern used in the sixth embodiment of the present invention.

FIG. 10 is a diagram showing a model of the operation of a transmission confirmation pattern used in the sixth embodiment of the present invention.

In the sixth embodiment, the information included in the transmission confirmation pattern is the number of data items as a transmission confirmation ID. As shown in FIG. 10, the receiver transfers a transmission confirmation to the transmitter when data items whose number is designated by the transmission confirmation pattern are received counted from the time when the satellite receive device 7 receives the transmission confirmation pattern at first. After this, this operation is repeated. That is, the receiver transfers the transmission confirmation to the transmitter repeatedly every time when the satellite receive device 7 receives data items whose byte number is designated by each transmission confirmation pattern.

Seventh Embodiment

Figure 11:
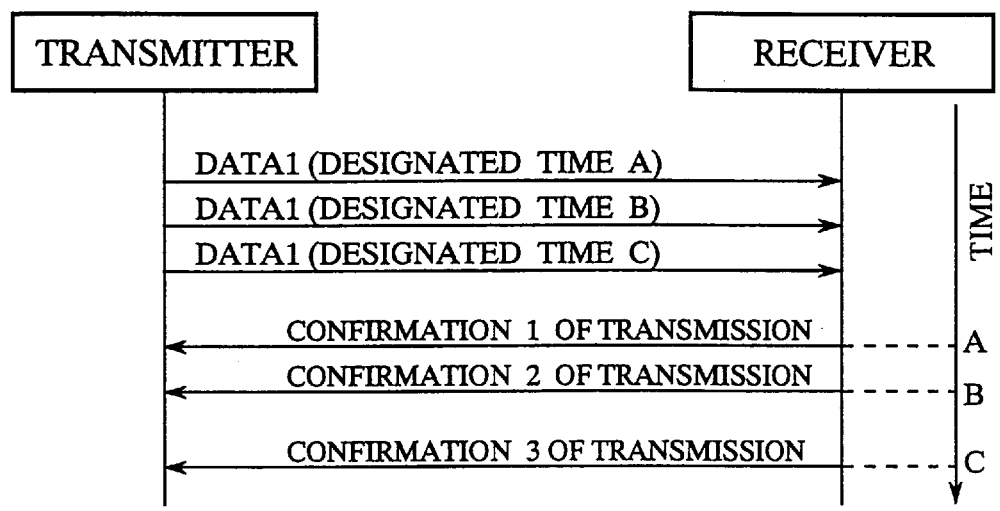
FIG. 11 is a diagram showing a model of the operation of a transmission confirmation pattern used in the seventh embodiment of the present invention.

FIG. 11 is a diagram showing a model of the operation of a transmission confirmation pattern used in the seventh embodiment of the present invention.

In the seventh embodiment, the information included in the transmission confirmation pattern is the transmitted time of the transmission confirmation as the transmission confirmation pattern ID.

As shown in FIG. 10, the receiver transfers a transmission confirmation for data, received by the satellite receive device 7 in the receiver, to the transmitter at the time designated by the transmission confirmation pattern. If when the satellite receive device 7 receives the data after the time designated by the transmission confirmation pattern, the receiver transfers the transmission confirmation to the transmitter when the receiver receives the distribution data item.

Eighth Embodiment

Figure 12:
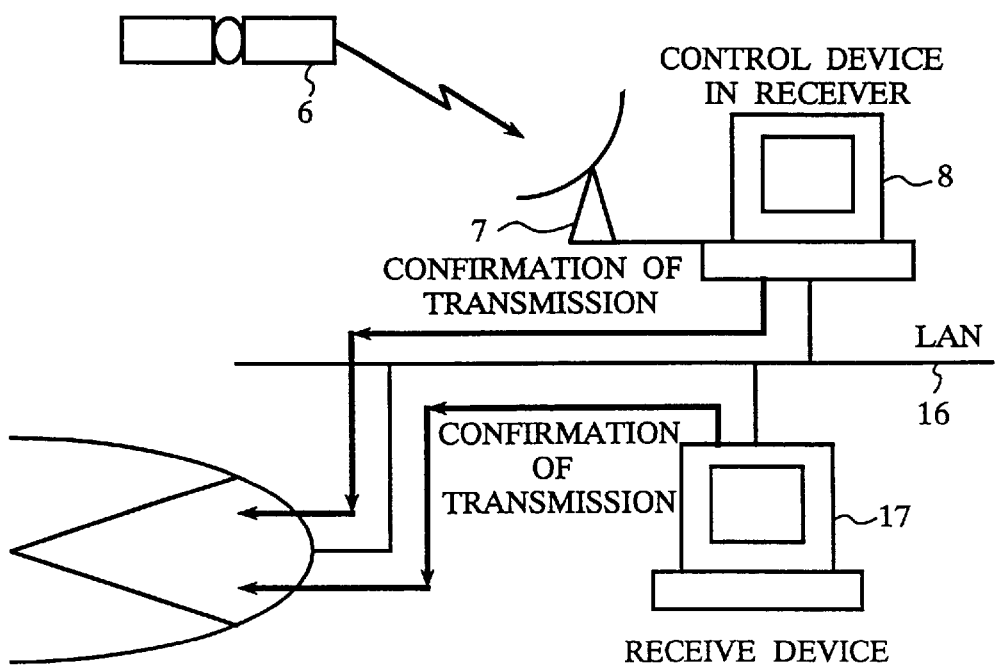
FIG. 12 is a diagram showing a configuration of a system having a transmission confirmation sending device having a selection function according to the eighth embodiment of the present invention.
Figure 13:
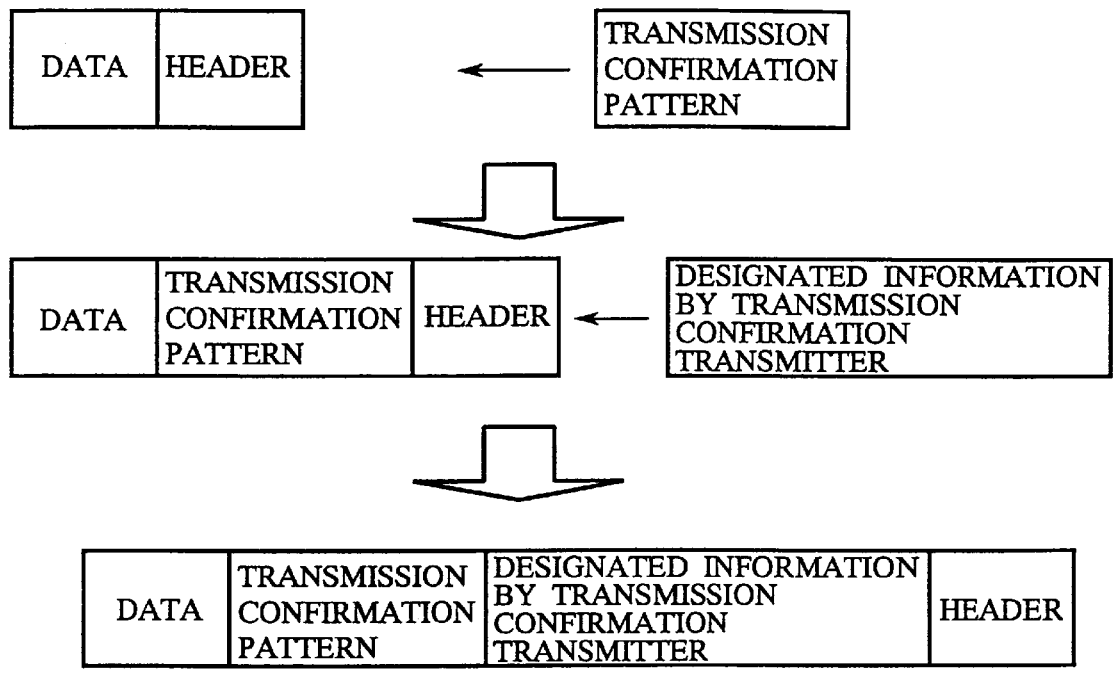
FIG. 13 is an insert operation of a designation information executed by the transmission confirmation sending device shown in FIG. 12.

FIG. 12 is a diagram showing a configuration of a system having a transmission confirmation sending device with a selection function according to the eighth embodiment of the present invention. FIG. 13 is an insert operation of the designation information executed by the transmission confirmation sending device shown in FIG. 12. The system of the eighth embodiment shown in FIG. 12 comprises a receive device 17 (or a receive terminal) and the control device 8 that are connected to a LAN (a local Area Network) 16 in addition to the configuration of the first embodiment shown in FIG. 1.

As shown in FIG. 13, the transmission confirmation designation information for the transmission confirmation sending device is inserted into the header, just like the transmission confirmation pattern used in the first embodiment, and then is transferred to the receiver with data items. When receiving the transmission confirmation designation information from the transmitter, the control device 8 in the receiver reads the designation information for the transmission confirmation sending device, selects one of the control device 8 and the receive device 17 as the transmission confirmation sending device based on this designation information. When the designated sending device is the control device 8, the received data item are divided into the data part, the transmission confirmation pattern part, and the designation information for the transmission confirmation sending device. Then, the control device 8 transfers the transmission confirmation to the transmitter according to the transmission confirmation pattern when the receiver receives the distribution data.

On the other hand, when the designated sending device is the receive device 17, the data received by the control device 8 is transferred to the receive device 17. The receive device 17 reads the data and confirms that the receive device 17 itself is the device to send the transmission confirmation to the transmitter. The received data is divided into the data part, the transmission confirmation pattern part, and the designation information part. Then, the receive device 17 transfers the transmission confirmation to the transmitter according to the transmission confirmation pattern when the receiver receives the distribution data.

Ninth Embodiment

Figure 14:
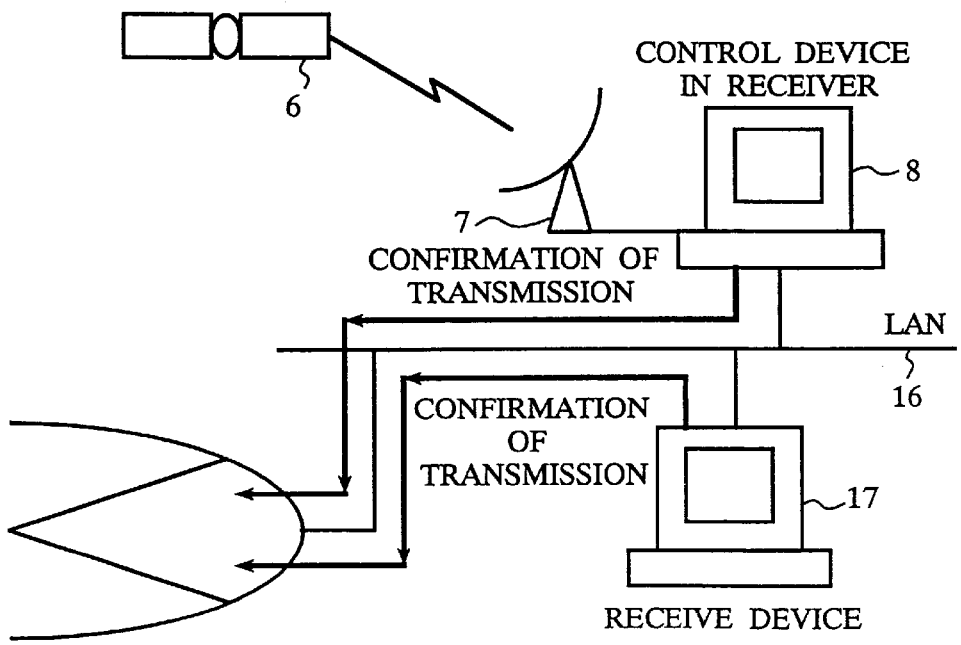
FIG. 14 is a diagram showing a configuration of a system having a transmission confirmation sending device with a selection function according to the ninth embodiment of the present invention.

FIG. 14 is a diagram showing a configuration of a system having a transmission confirmation sending device with a selection function according to the ninth embodiment of the present invention.

The configuration of the system as the data distribution apparatus is the same as that of the first embodiment. The control device 8 in the receiver outputs data and a transmission confirmation information that is inserted into the header of the data, like the case of the transmission confirmation pattern disclosed in the eighth embodiment shown in FIG. 13. This transmission confirmation information to be transferred to the transmitter is a preceding information that is transferred before target data items are received by the control device in the receiver. There is no case where both transmission confirmation information as the preceding information and the transmission confirmation designation information are in a same data item. When receiving data, the control device 8 in the receiver checks whether or not this data includes the transmission confirmation information as the preceding information. When the data includes no preceding information, the control device 8 performs the same operation as the control device in the eighth embodiment shown in FIG. 12.

When the data includes the preceding transmission confirmation information, the control device 8 in the receiver divides the received data into a data part, the preceding transmission information part, and the designation information part of the transmission confirmation sending device. The control device 8 transfers the transmission confirmation according to the transmission confirmation pattern. In this case, this transmission confirmation is transferred to the transmitter based on the time when,the control device 8 in the receiver receives the distribution data. That is, the above operation is performed even if the transmitted data item is received by the receive device 17.

Tenth Embodiment.

Figure 15:
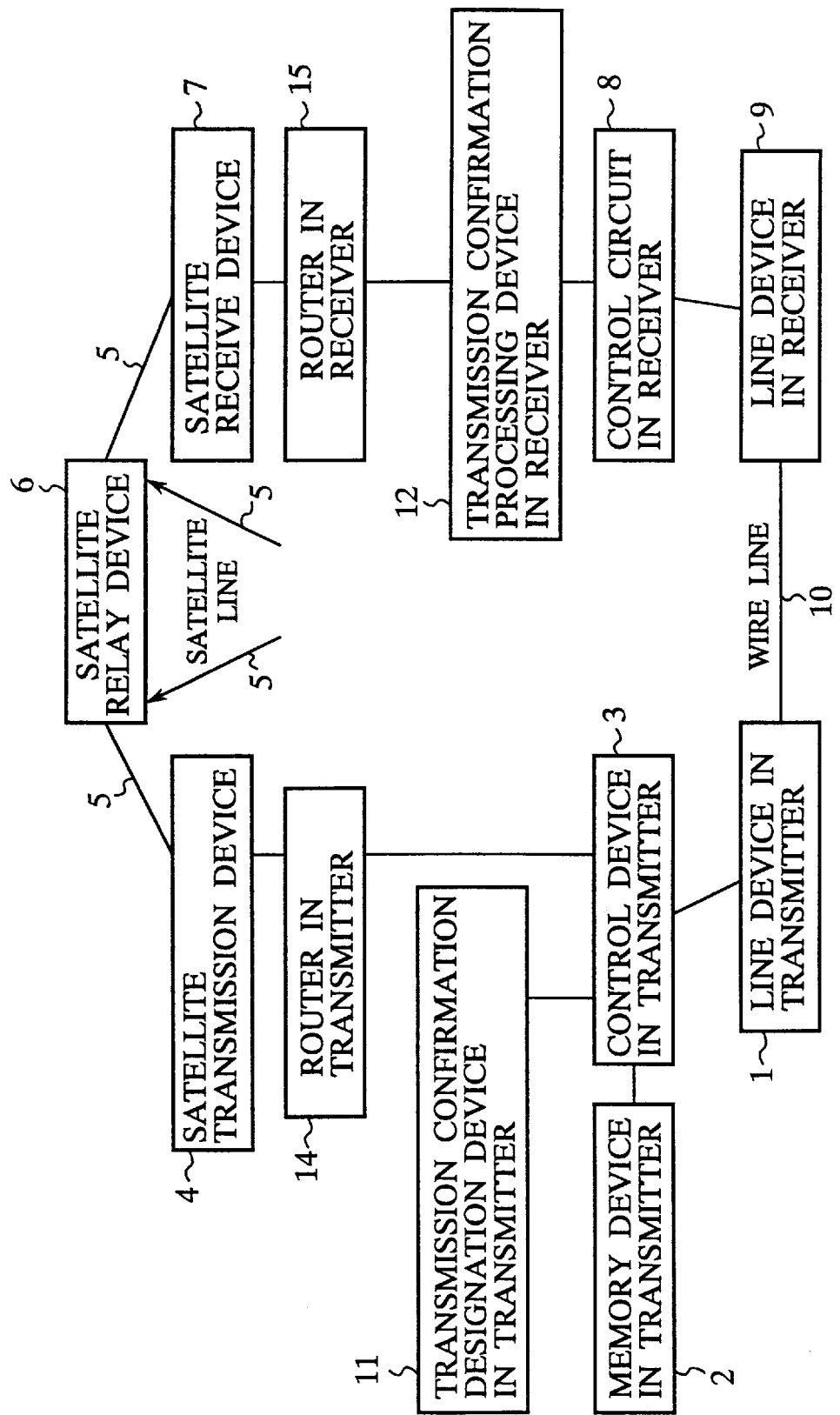
FIG. 15 is a diagram showing a configuration of a data distribution apparatus according to the tenth embodiment of the present invention.

FIG. 15 is a diagram showing a configuration of a data distribution apparatus according to the tenth embodiment of the present invention.

In FIG. 15, the reference number 14 designates a router device in the transmitter connected between the satellite transmission device 4 and the control device 3 in the transmitter. The router device 14 receives the data transmission request from the control device 3 in the transmitter and converts it so that the satellite transmission device 4 can analyze this data transmission request and transfers it to the satellite transmission device 7. The reference number 15 denotes a router device in the receiver connected between the satellite receive device 7 and the control device 8 in the receiver. The router 15 converts the data received by the satellite receive device 7 into data that can be analyzed by the control device 8 in the receiver and transfers the converted data to the transmission confirmation processing device in the receiver 12. Other components of the data distribution device of the tenth embodiment are the same of those in the first embodiment shown in FIG. 1, therefore the explanation of them is omitted here for brevity and the same reference numbers will be used.

Next, a description will now be given of the operation of the data distribution apparatus of the tenth embodiment.

The control device 8 in the receiver transfers a data request to the wire line 10 through the line device 9 in the receiver. The line device 1 in the transmitter transfers this data request from the receiver to the control device 3 in the transmitter. The control device 3 receives the data stored in the memory device 2 according to the received data request. The control device 3 transfers the readout data to the router device 14 in the transmitter.

The router device 14 in the transmitter receives the data from the control device 3 and transfers this data to the satellite transmission device 4. The satellite transmission device 4 transmits this data to the satellite receive device 7 through the satellite line and the satellite relay device 6.

The satellite receive device 7 receives the data and passes this received data to the router device 15 in the receiver. Then, this router device 15 in the receiver transfers this data to the control device 8 as the target device in the receiver that is incorporated in the data distribution device of the tenth embodiment corresponding to the control device 3 in the transmitter.

Eleventh Embodiment

Figure 16:
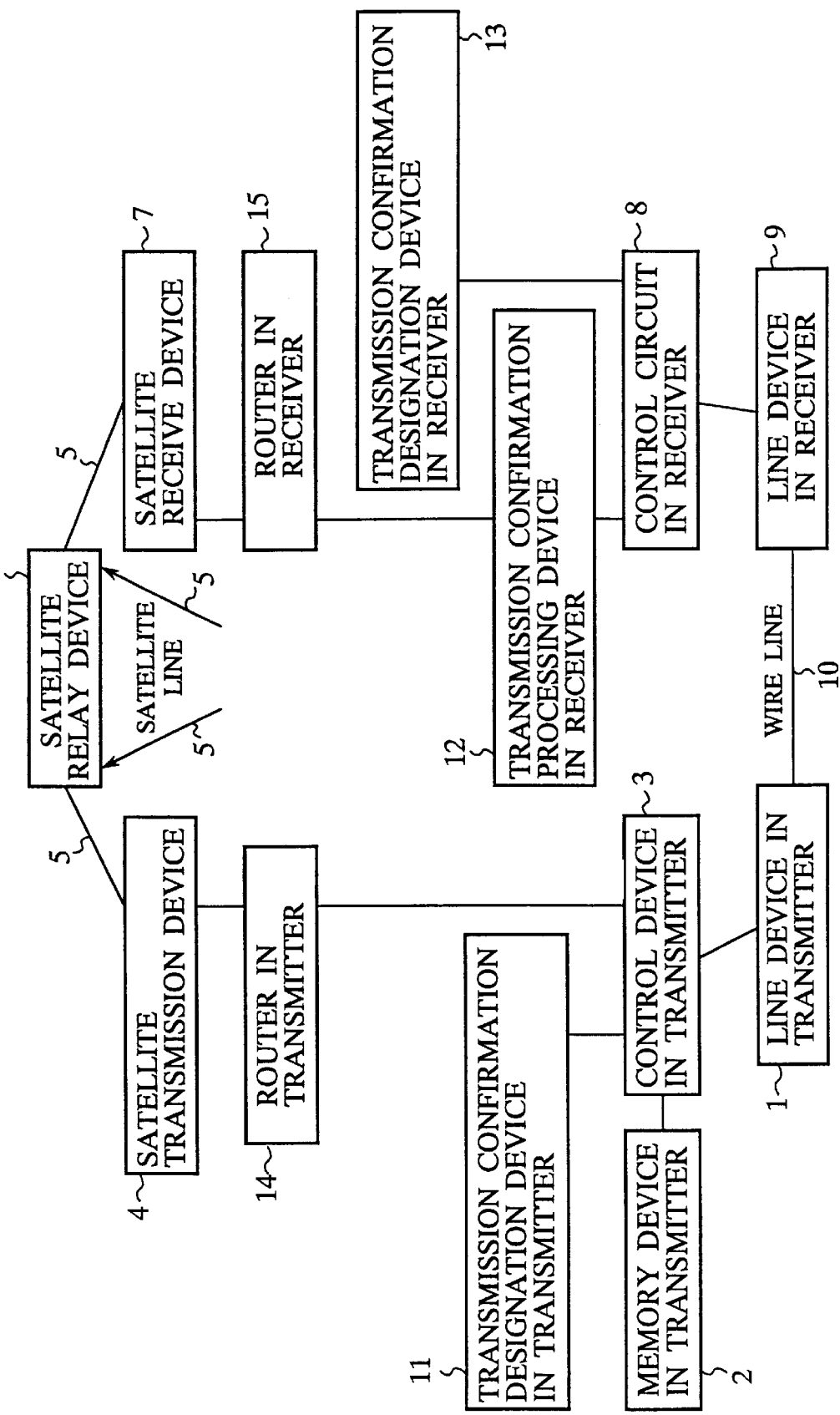
FIG. 16 is a diagram showing a configuration of a data distribution apparatus according to the eleventh embodiment of the present invention.

FIG. 16 is a diagram showing a configuration of a data distribution apparatus according to the eleventh embodiment of the present invention. In FIG. 16, the data distribution apparatus of the eleventh embodiment comprises a transmission confirmation designation device 13 in the receiver, that has been disclosed in the second embodiment shown in FIG. 5, in addition to the configuration of the tenth embodiment shown in FIG. 15. Therefore, the explanation of them is omitted here. That is, the data distribution device of the eleventh embodiment has the same effect as the data distribution device of the second embodiment.

Twelfth Embodiment

Figure 17:
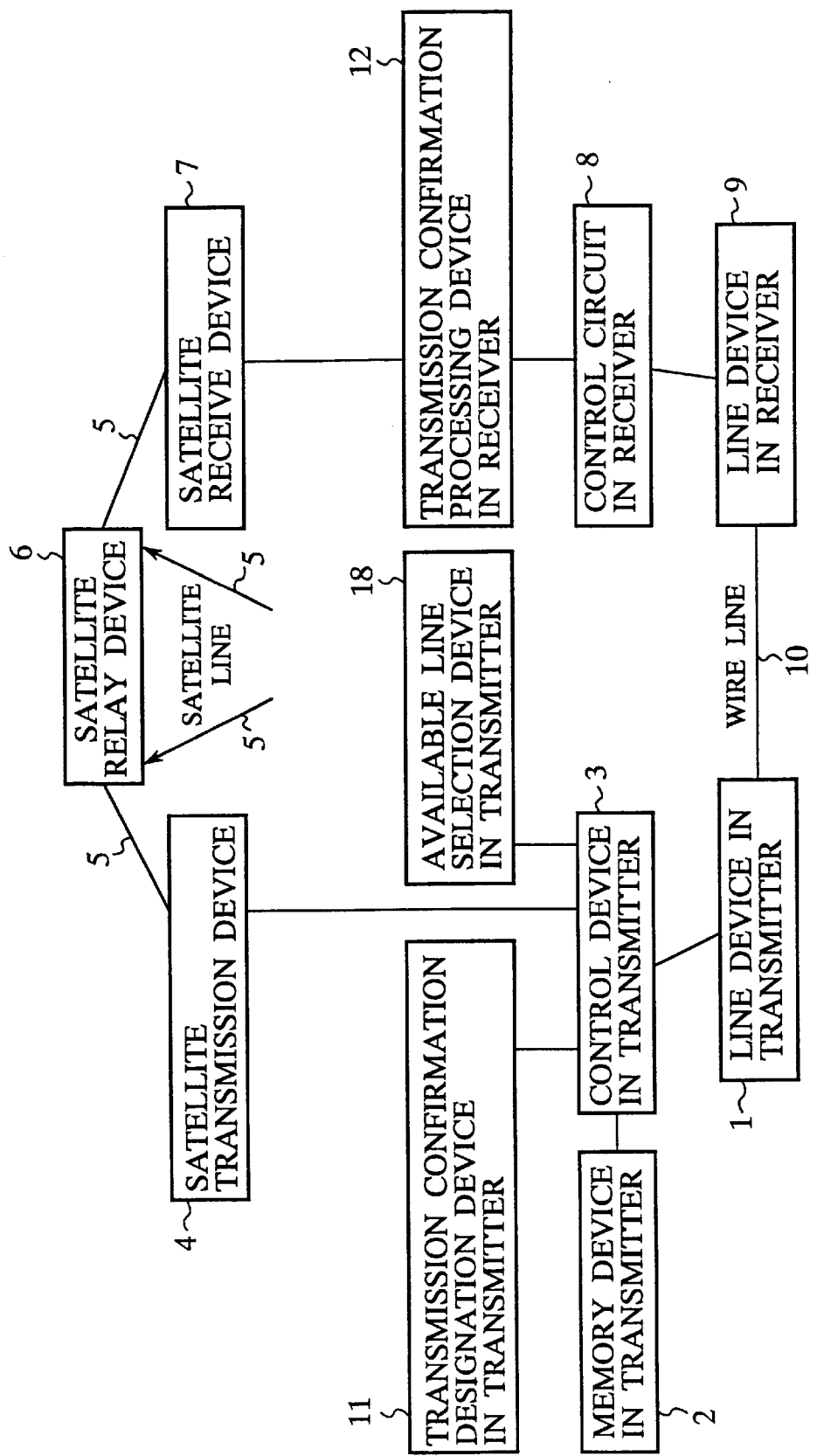
FIG. 17 is a diagram showing a configuration of a data distribution apparatus according to the twelfth embodiment of the present invention.

FIG. 17 is a diagram showing a configuration of a data distribution apparatus according to the twelfth embodiment of the present invention. In FIG. 17, the reference number 18 designates an available line selection device in the transmitter connected to the control device 3 through a LAN (a Local Area Network that is omitted from FIG. 17 for brevity). Other components of the data distribution apparatus of the twelfth embodiment are the same as those of the first embodiment, therefore, the explanation of them is omitted here and the same reference numbers are used for the same components.

Figure 18:
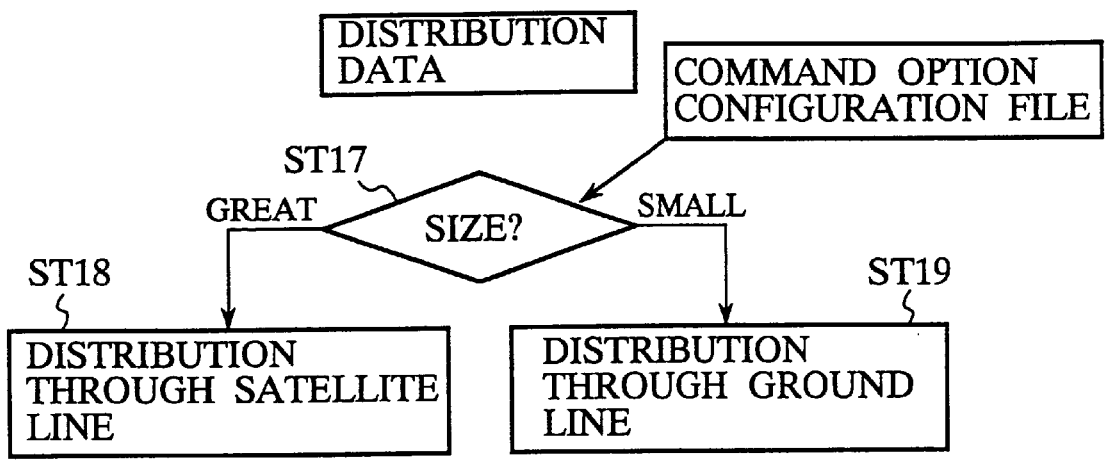
FIG. 18 is a diagram showing an operation algorithm of an automatic selection function to select a target line to be used according to a distribution data size.

FIG. 18 is a diagram showing an operation algorithm of an automatic selection function to select a target line to be used according to a distribution data size. In the data distribution apparatus of the twelfth embodiment shown in FIG. 18, the control device 3 in the transmitter transfers the data to the available line selection device 18 in the transmitter according to a data distribution request from the receiver. The available line selection device 18 calculates a data size of data to be distributed. When a threshold data size has been designated in an option of a distribution command, the selection device 18 selects this data sizes, if it is not designated in the option of the distribution command, the selection device 18 selects a value described in the configuration file as the threshold data size. Next, the calculated data size is compared with the threshold data size (step ST17), when the data size is longer than the threshold data size, the data distribution is performed through the satellite line with a high transmission speed. When it is not longer, the data distribution is executed through the ground line with a low transmission speed (Steps ST18 and ST19).

Figure 19:
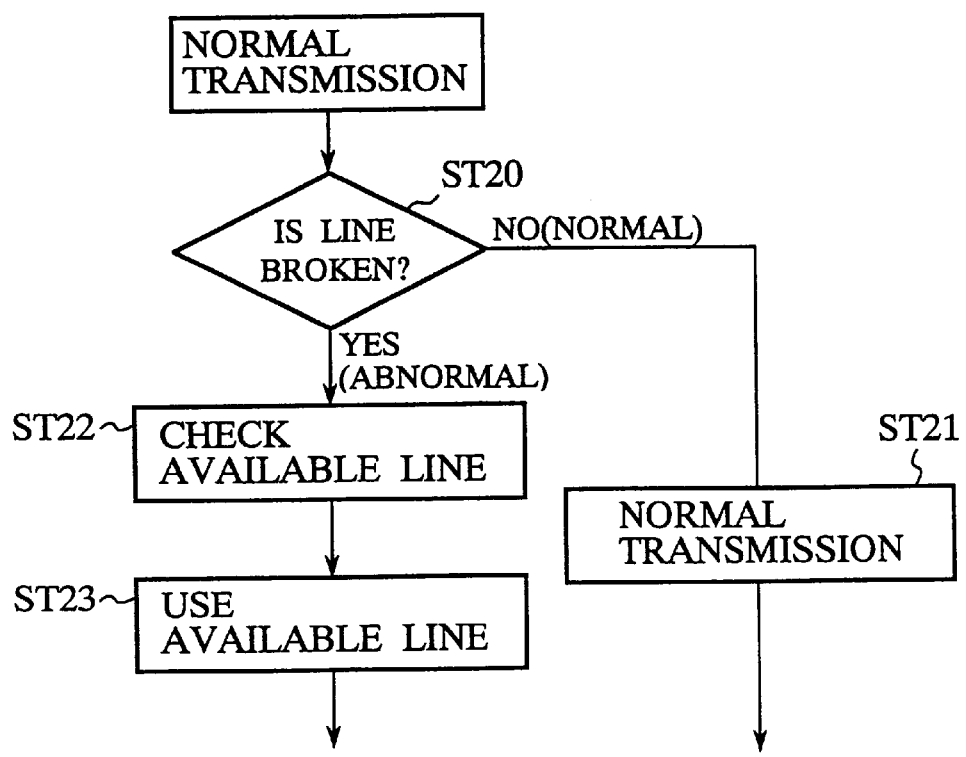
FIG. 19 is an operation algorithm of an automatic selection function for a currently used line.

FIG. 19 is an operation algorithm of an automatic selection function for a line that is currently used. As shown in FIG. 19, the line selected by the automatic selection function for the current line is used. During the normal operation of the data distribution, it is checked to determine whether or not the current line can be selected (Step ST20). When there is no problem, the current line is used continuously for the data distribution (Step ST21). On the other hand, if the current line is broken, the available line selection device 18 checks whether or not un-selected lines in the preceding selection operation can be used (Step ST22). When it can be used as the current line, the available line selection device 18 selects this line in order to transmit the data again (Step ST23). The transmission unit in the data distribution is a packet.

Thirteenth Embodiment

Figure 20:
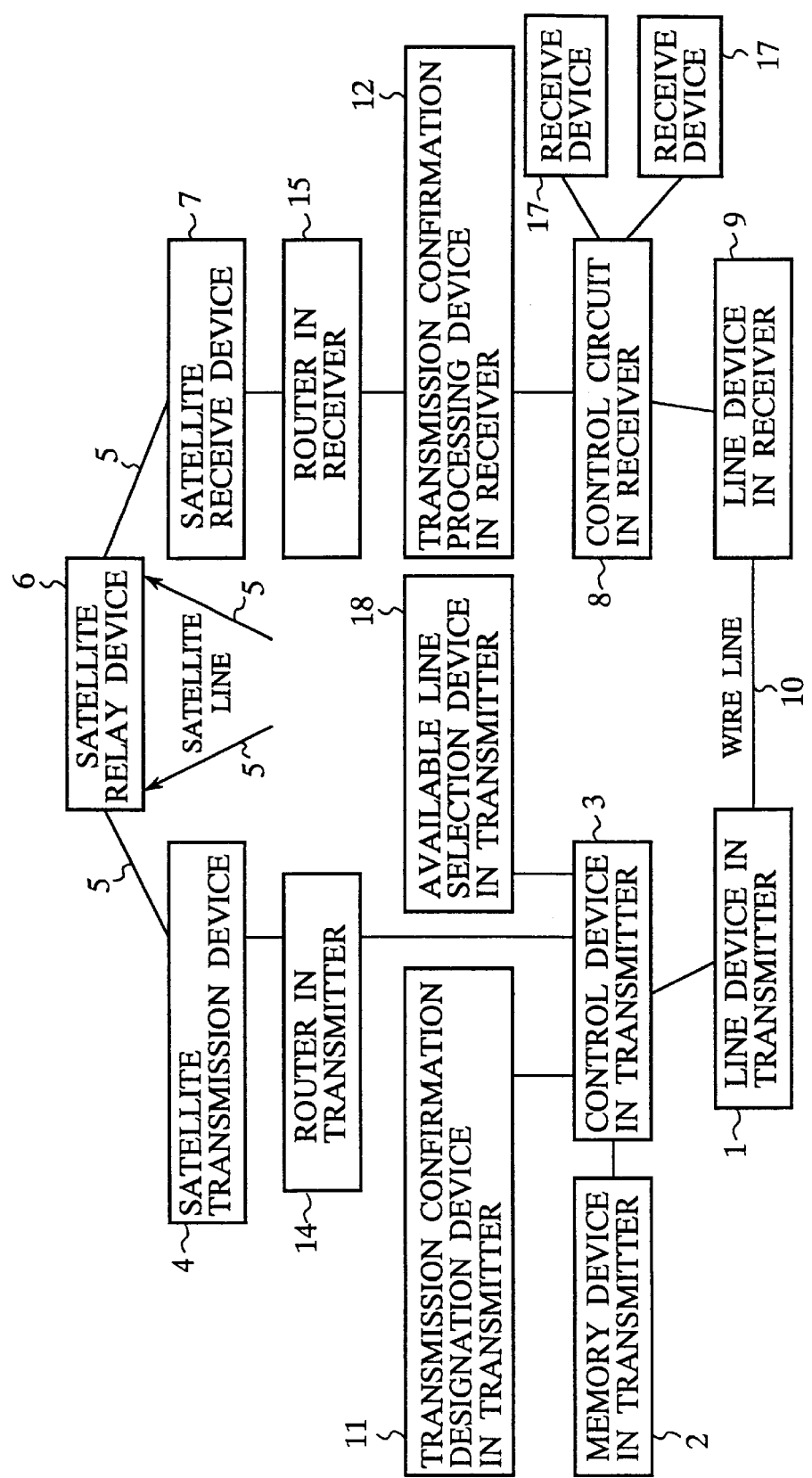
FIG. 20 is a diagram showing a configuration of a data distribution apparatus according to the thirteenth embodiment of the present invention.

FIG. 20 is a diagram showing a,configuration of a data distribution apparatus according to the thirteenth embodiment of the present invention.

The data distribution device of the thirteenth the embodiment has the configuration in which the available line selection device 18 in the data distribution device of the twelfth embodiment shown in FIG. 15 is incorporated in the configuration of the tenth embodiment shown in FIG. 15. Therefore, the effect and the operation are the same as that of the combination of the tenth embodiment and the twelfth embodiments, and the explanation of them is omitted here.

Fourteenth Embodiment

Figure 21:
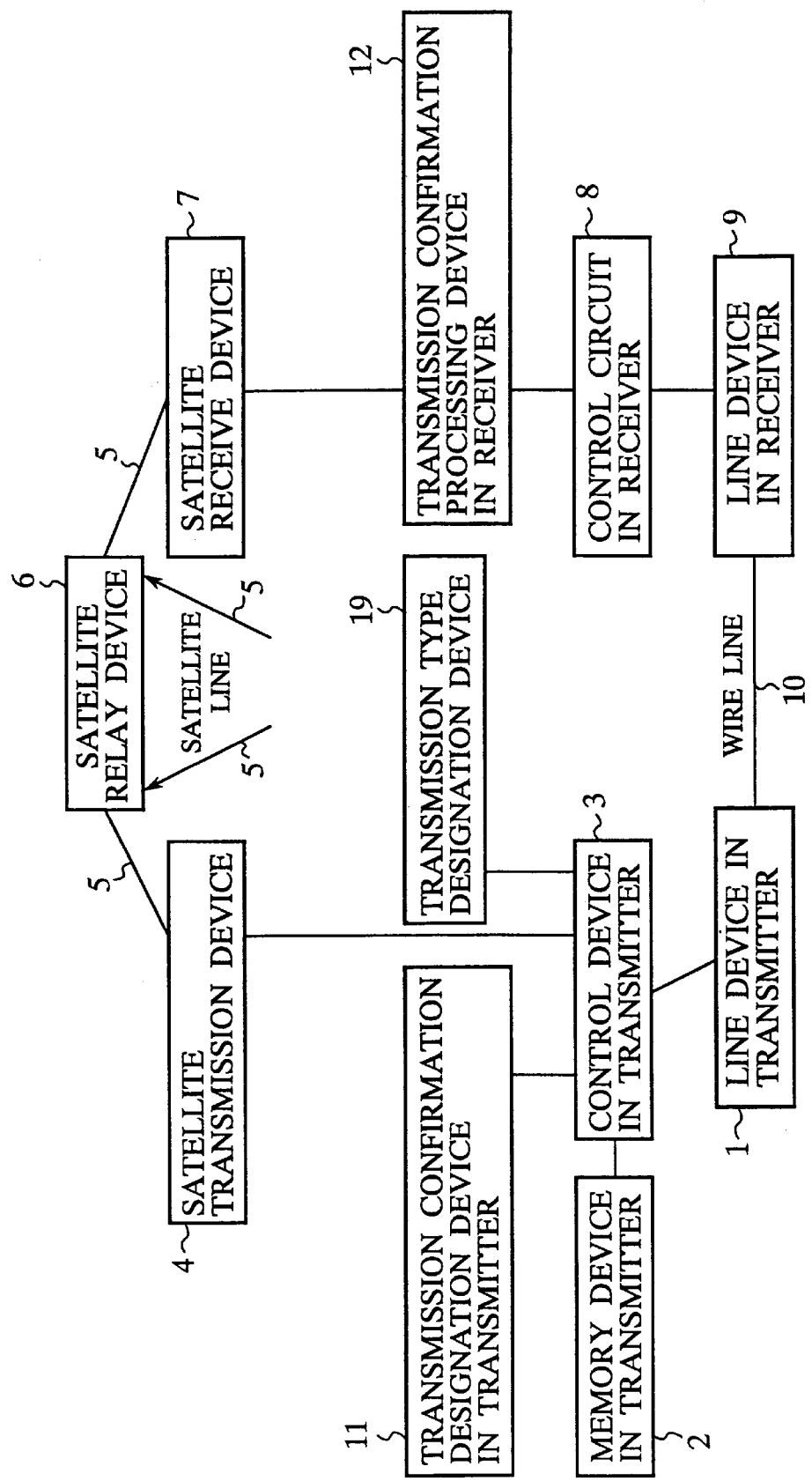
FIG. 21 is a diagram showing a configuration of a data distribution apparatus according to the fourteenth embodiment of the present invention.

FIG. 21 is a diagram showing a configuration of a data distribution apparatus according to the fourteenth embodiment of the present invention. In FIG. 21, the reference number 19 designates a transmission type designation device in the transmitter connected to the control device 3 through a LAN, for example. Other components are the same as those in the first embodiment, therefore, the explanation of them is omitted and the same reference numbers are used.

Next, a description will now be given of the operation of the data distribution device of the fourteenth embodiment.

When receiving a data distribution request, the IBM control device 3 transfers this request to the transmission type designation device 19. The transmission type designation device 19 reads the data transmission type described in a distribution command option or a configuration file in the transmitter and then transfers an instruction to the control device 3 in the transmitter so that the data distribution will be performed according to the designated transmission type by the control device 3.

The control device 3 receives the instruction from the transmission type designation device 19, performs the data distribution based on the data distribution method according to the transmission type designated by the instruction.

Figure 22:
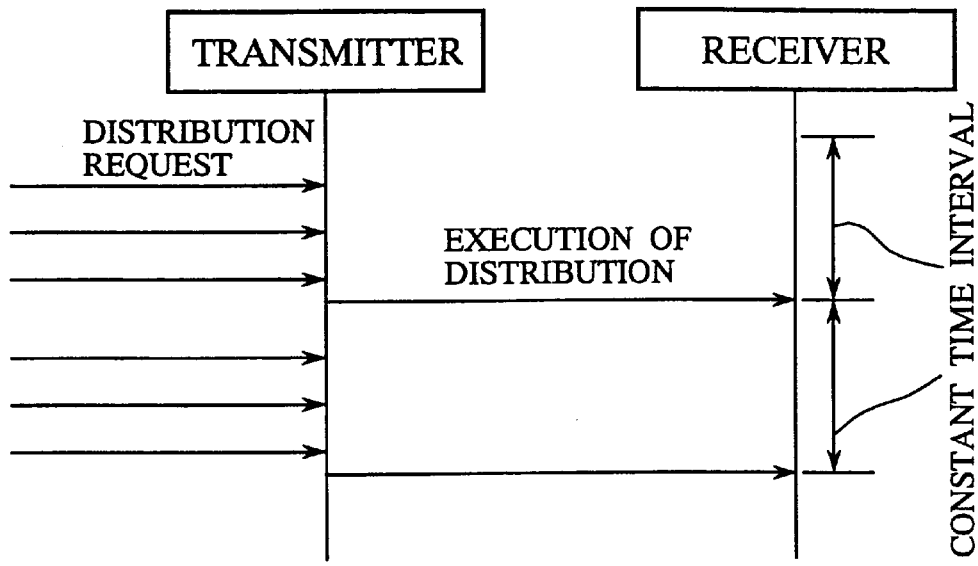
FIG. 22 is a diagram showing a model of the operation of a data distribution pattern performed by the data distribution apparatus of the fourteenth embodiment of the present invention shown in FIG. 21.

FIG. 22 is a diagram showing a model of the operation of the data distribution pattern performed by the data distribution apparatus of the fourteenth embodiment of the present invention shown in FIG. 21.

In the fourteenth embodiment shown in FIG. 22, the data distribution is not performed after every receiving of a data distribution request. That is, a plurality of data distribution requests during a predetermined time period are grouped to make a large volume data items, and then the transmitter distributes the large volume data items to the receiver.

Figure 23:
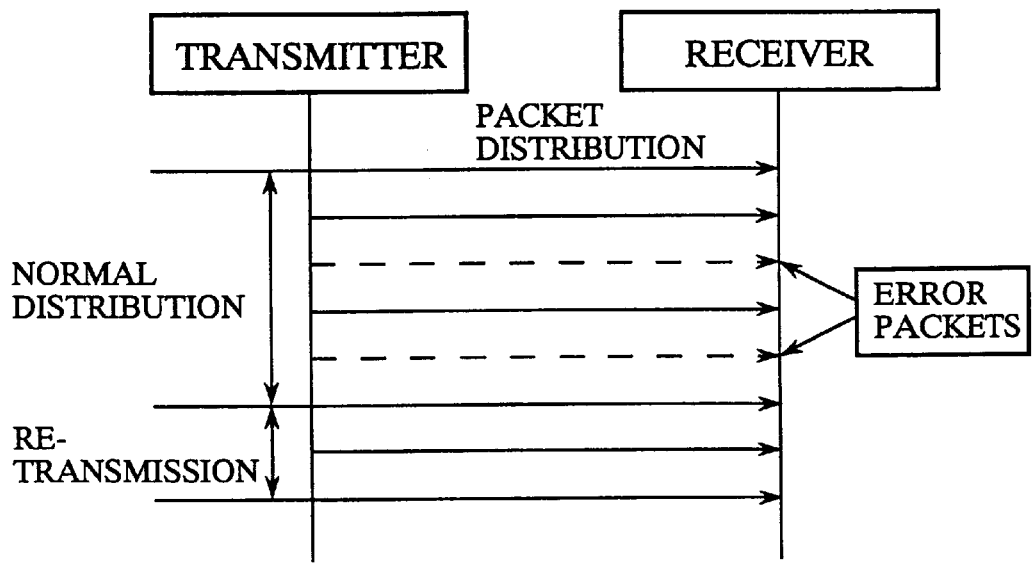
FIG. 23 is a diagram showing a model of the operation of a re-transmission pattern executed by the data distribution apparatus of the fourteenth embodiment of the present invention shown in FIG. 21.

FIG. 23 is a diagram showing the operation of a re-transmission pattern executed by the data distribution apparatus of the fourteenth embodiment of the present invention shown in FIG. 21. In the fourteenth embodiment shown in FIG. 23, when failure of data packet transmission in the data distribution operation happens (see the dotted lines in FIG. 23), the failure packets are grouped and then grouped error packets or failure packets are transmitted to the receiver after a series of the data packet transmissions is completed.

Fifteenth Embodiment

Figure 24:
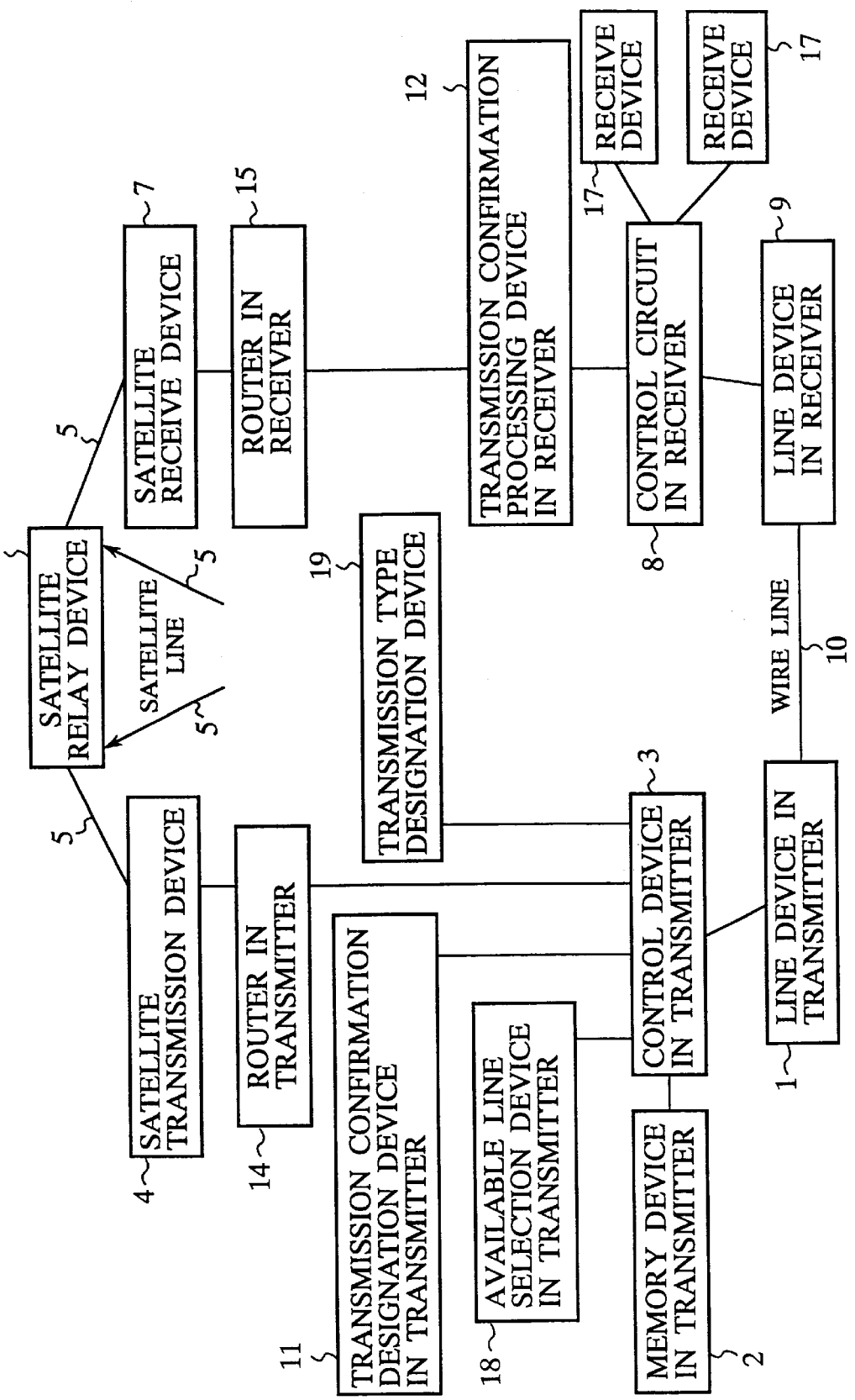
FIG. 24 is a diagram showing a configuration of a data distribution apparatus according to the fifteenth embodiment of the present invention.
Figure 25:
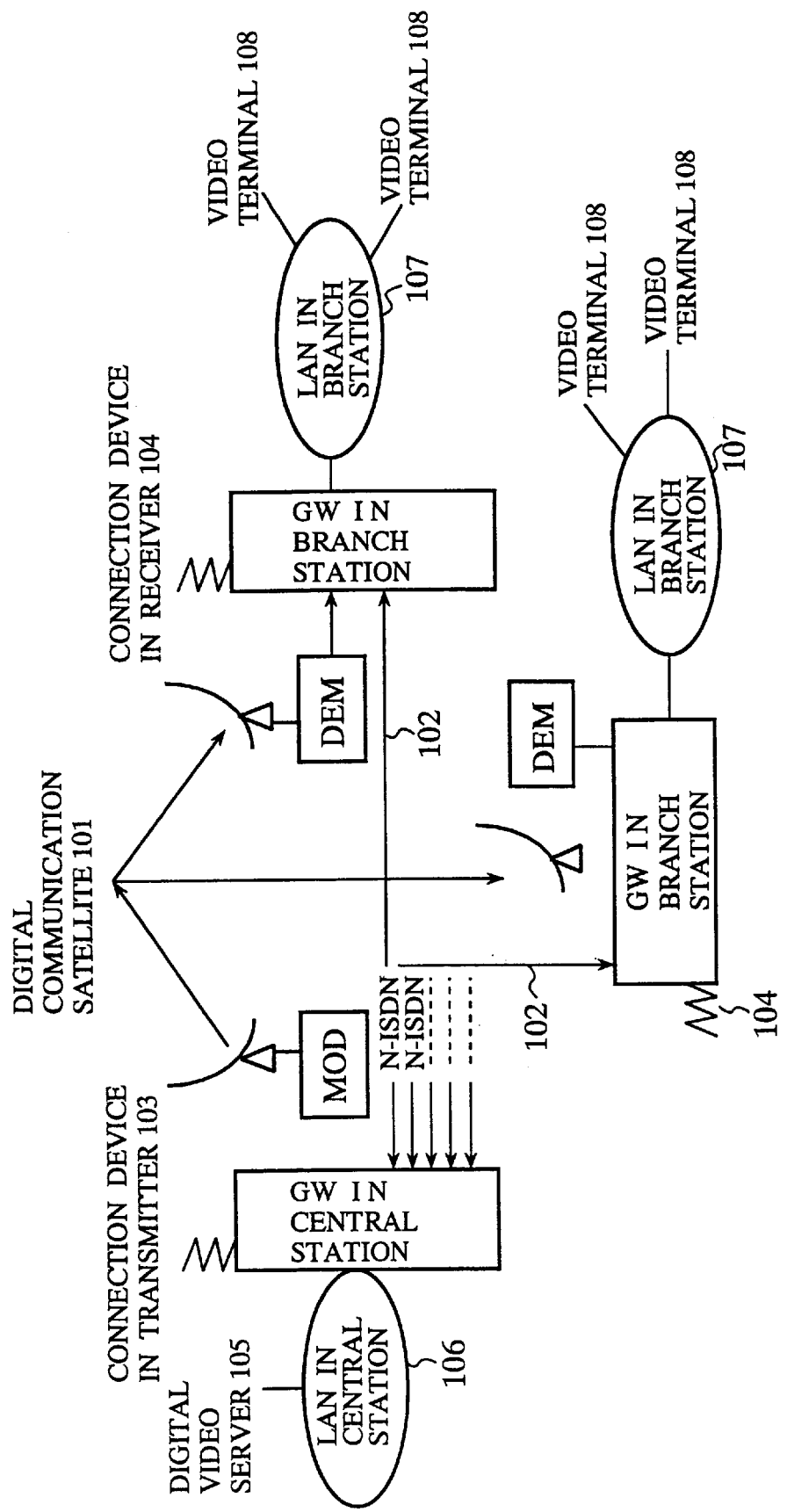
FIG. 25 is a diagram showing the configuration of a conventional data distribution device.
Figure 26:
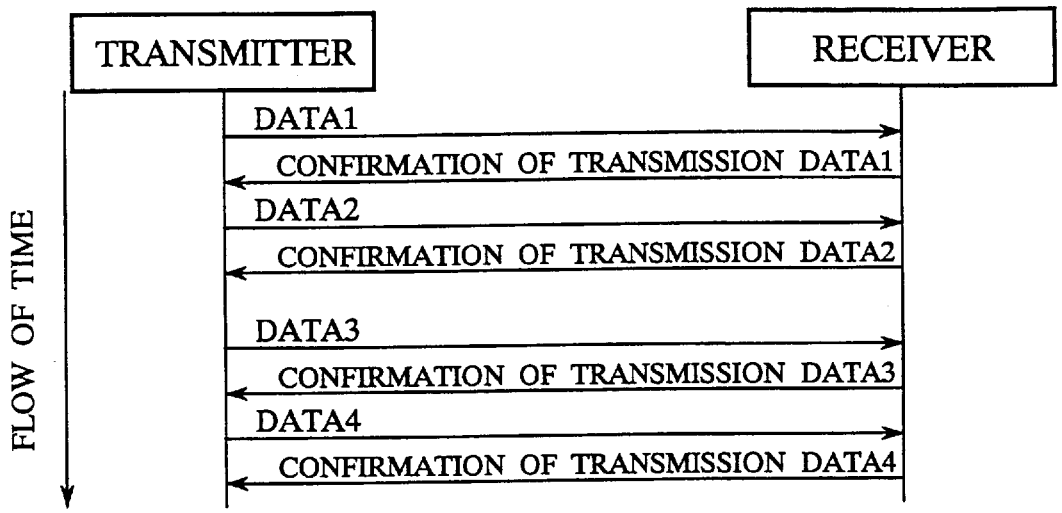
FIG. 26 is a diagram showing a conventional process flow of a general transmission confirmation pattern.
Figure 27:
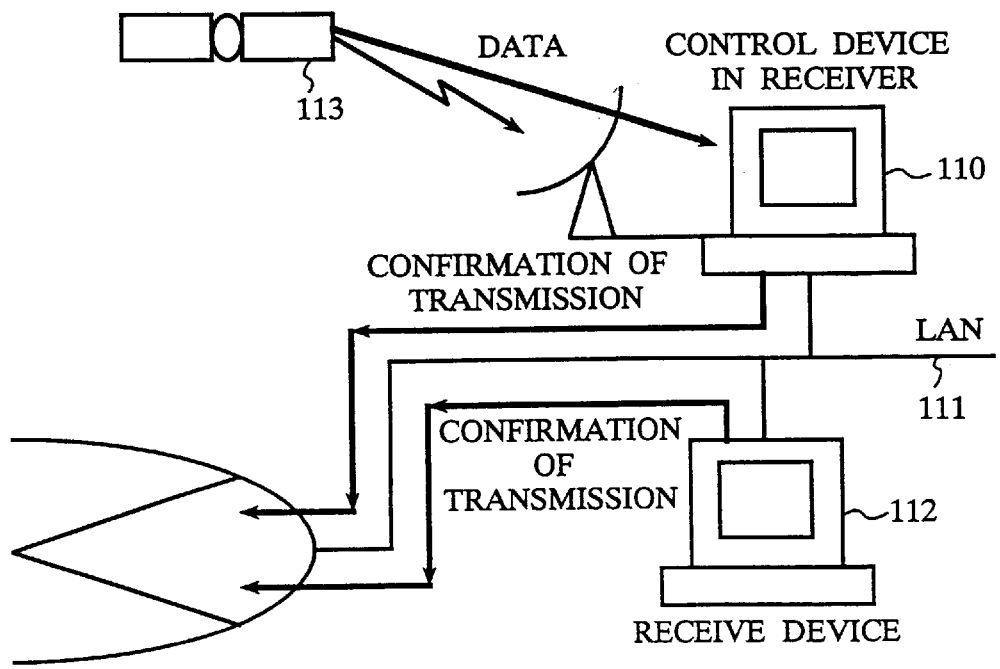
FIG. 27 is a diagram showing a concept of a general configuration of a data communication system and a data process flow in which a receiver receives a data item and transmits a transmission confirmation to a transmitter.

FIG. 24 is a diagram showing a configuration of a data distribution apparatus according to the fifteenth embodiment of the present invention.

The data distribution apparatus of the fifteenth embodiment comprises the transmission type designation device 19 in the transmitter shown in FIG. 21 in addition to the configuration of the data transmission apparatus of the thirteenth embodiment shown in FIG. 20. It is thereby possible to get the same effect of the combination of the thirteenth embodiment and the fourteenth embodiment. Therefore, the explanation of the fifteenth embodiment is omitted.

In summary, as described above in detail, according to the present invention, the transmitter checks the presence or the absence of the transmission confirmation and designates the transmission confirmation pattern, and the receiver outputs the transmission confirmation to the transmitter according to the content of the transmission confirmation pattern. It is thereby possible to designate the most suitable transmission confirmation pattern to match various conditions such as the number of data items to be distributed, the number of receive devices as the receiver, the buffer size of the receiver and the like after, every executing of the data distribution as an option in a distribution command, or it is also possible to designate the most suitable transmission confirmation pattern by the configuration file in the transmitter. Accordingly, there is the effect in which it is possible to transmit the transmission confirmation through the most suitable line in the transmitter and the receiver efficiently.

In addition, according to the present invention, the transmitter and the receiver checks for the presence or the absence of the transmission confirmation and designates the transmission confirmation pattern, the receiver transfers the transmission confirmation to the transmitter according to the received content indicating the presence or the absence of the transmission confirmation. There is the effect in which it is possible to perform the designation of the transmission confirmation pattern by the receiver at the data distribution request.

Furthermore, according to the present invention, the transmitter can check for the presence or the absence of the transmission confirmation and designates the transmission confirmation pattern and the available line to be used for the data distribution. The transmitter transfers the distribution data through the designated line, and the receiver transfers the transmission confirmation to the transmitter according to the presence or the absence of the transmission confirmation and the content of the transmission confirmation pattern. It is thereby possible to perform the data distribution operation efficiently without greatly reducing the performance of the small sized data distribution and without increasing of the cost of the small sized data distribution.

Furthermore, according to the present invention, the transmitter can check for the presence or the absence of the transmission confirmation and designates a transmission type whether or not the transmission confirmation pattern and the transmission request data item are grouped and then transmitted according to the designated transmission type. The receiver transmits the transmission confirmation to the transmitter according to the received content of the presence or the absence of the transmission confirmation and the transmission confirmation pattern. It is thereby possible to obtain the effect in which the data distribution can be performed efficiently. Specifically, when the data distribution of small sized data items is performed, it is possible to perform the data distribution efficiently without extremely reducing the performance of the data distribution.

Moreover, according to the present invention, the transmission confirmation designation device in the transmitter to designate the transmission pattern and the transmission confirmation processing device in the receiver are incorporated. Thereby, it is possible to designate the most suitable transmission confirmation pattern to match various conditions such as the number of data items to be distributed, the number of receive devices as the receiver, the buffer size of the receiver and the like after, every executing of the data distribution as an option in a distribution command, or it is also possible to designate the most suitable transmission confirmation pattern by the configuration file in the transmitter. Accordingly, there is the effect in which it is possible to transmit the transmission confirmation through the most suitable line in the transmitter and the receiver efficiently.

In addition, according to the present invention, the receiver comprises the transmission confirmation designation device. There is the effect that it is therefore possible to perform the transmission confirmation pattern by the receiver when the request of the data distribution is transmitted to the transmitter.

Furthermore, according to the present invention, when the transmitter transmits a plurality of data items to the receiver during a predetermined constant time period, the receiver transmits only one transmission confirmation to the transmitter for the group of the plurality of data items that have been received. It is thereby possible to reduce the load on the transmitter to receive transmission confirmations and to reduce the traffic on the wire line through which the transmission confirmations are transmitted from the receiver to the transmitter. Specifically, when there are many receivers in a multi-casting distribution, it is possible to reduce the number of transmission confirmations and to greatly reduce the load on the transmitter about the receiving of the transmission confirmations.

In addition, according to the present invention, when the transmitter transmits a plurality of distribution data items, the receiver transmits the transmission confirmation to the transmitter at a random time in a predetermined constant time period. It is thereby possible to disperse the receiving time of the transmission confirmation by the transmitter, and to reduce the load of the transmitter. Specifically when, there are many receivers in a multi-casting distribution, it is possible to reduce the number of transmission confirmations, to avoid a case in which the transmission confirmations are transmitted from the receivers simultaneously, and to greatly reduce the load of the transmitter about the receiving of the transmission confirmations.

Furthermore, according to the present invention, the receiver transmits the transmission confirmation to the transmitter when the receiver receives the data items whose byte number is equal to the designated number of data items. It is thereby possible to reduce the number of the transmission confirmations to be received by the transmitter, and to reduce the load of the transmitter and to reduce the traffic of the used line.

Moreover, according to the present invention, the receiver transmits the transmission confirmation to the transmitter when the receiver receives the data items whose number is equal to the designated number of data items. It is thereby possible to reduce the number of the transmission confirmations to be received by the transmitter, and to reduce the load of the transmitter and to reduce the traffic of the sued line.

In addition, according to the present invention, the receiver transmits the transmission confirmation to the transmitter at the transmission confirmation sending time designated by the transmitter counted after the receiver receives the distribution data. It is thereby possible to disperse the receiving time of the transmission confirmation in the transmitter, and to reduce the load of the transmitter. Specifically when, there are many receivers in a multi-casting distribution, it is possible to reduce the number of transmission confirmations, to avoid a case in which the transmission confirmations are transmitted from the receivers simultaneously, and to greatly reduce the load of the transmitter about the receiving of the transmission confirmations.

Furthermore, according to the present invention, one receiver and the receive devices selected by the transmitter transmits the transmission confirmation to the transmitter after the receiver receives the distribution data. It is thereby possible to reduce the load of the receive device because the control device in the receiver transmits the transmission confirmation to the transmitter, for example. In addition to this effect, it is thereby possible to send the transmission confirmation by the device of a lighter load so that the entire load in the receiver can be dispersed, for example, the receive device connected to the control device in the receiver through a LAN can transmit the transmission confirmation according to the instruction of the control device in the transmitter.

Moreover, according to the present invention, one of the following transmission methods can be selected: when receiving data (that is not the distribution data) from the transmitter, the control device in the receiver transmits the transmission confirmation to the transmitter in advance (namely the pre-transmission confirmation); and when receiving the distribution data from the transmitter at first, the control device in the receiver transmits the transmission confirmation to the transmitter. It is thereby possible to send the transmission confirmation from the control device in the receiver when the control device receive the data, even if the receive device can not operate from one cause or another and can not receive any data. In this case, it is not necessary for the transmitter to transmit the distribution data again after the receive device in the receiver recovers because the receive device can receive the distribution data that is temporarily stored in the control device in the receiver. It is thereby possible to perform the data distribution from the transmitter to the receiver efficiently.

In addition, according to the present invention, data items are transmitted from the control device in the transmitter to the control device in the receiver through the router device in the transmitter, the satellite transmission device, the satellite receive device, and the router device in the receiver. It is possible to form the control devices in the transmitter and the receiver in a simple configuration. In addition to this effect, it is thereby possible to perform the data distribution efficiently.

Furthermore, according to the present invention, the data size to be transmitted is checked. When the size is smaller than a designated data size, the data distribution is performed through the ground wire line. And if not, it is executed through the satellite line. It is thereby possible to perform the small sized data distribution efficiently in cost without reducing the data distribution performance.

Moreover, according to the present invention, a determination is made as to whether or not there is unfused available line when the current line is down. In this case, the current line is switched to the available line in order to transmit distribution data items that have not been received by the receiver. It is thereby possible to recover from the fault before any user is affected.

In addition, according to the present invention, data items are transmitted from the control device in the transmitter to the control device in the receiver through the router device in the transmitter, the satellite transmission device, the satellite receive device, and the router device in the receiver. It is possible to form the control devices in the transmitter and the receiver in a simple configuration. In addition to this effect, it is thereby possible to perform the small sized data distribution efficiently in cost.

Furthermore, according to the present invention, the transmitter packs data items into one data that are requested by the receiver during a constant time period designated by a configuration file or a command option used in the transmitter and transmits the packed data to the receiver. It is thereby possible to perform the data distribution efficiently. Specifically, it is possible to transmit a plurality of small-sized data items efficiently without reducing the performance of the data distribution.

Moreover, according to the present invention, when the failure of the packet transmission happens, the transmitter transmits the group of failure packets to the receiver after the normal data distribution has been completed. It is thereby possible to avoid a packet interrupt re-transmission and to re-transmit the failure packets without reducing the data distribution efficiency.

In addition, according to the present invention, data items are transmitted from the control device in the transmitter to the control device in the receiver through the router device in the transmitter, the satellite transmission device, the satellite receive device, and the router device in the receiver. It is possible to form the control devices in the transmitter and the receiver in a simple configuration. In addition to this effect, it is thereby possible to perform the small sized data distribution efficiently in cost and to perform the re-transmission of the failure packets.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data distribution method for performing data distribution between a transmitter and a receiver, comprising:

detecting in the transmitter a data transmission confirmation pattern designation in a command option;

selecting the content of a data transmission confirmation pattern by the transmitter, based on the detected data transmission confirmation pattern designation in the command option, the content of the data transmission confirmation pattern indicating at least one of an amount of data to be transmitted and a transmission time;

inserting the content of the data transmission confirmation pattern into data to be transmitted, and transmitting the resulting data; and outputting a data transmission confirmation from the receiver to the transmitter according to the the content of the data transmission confirmation pattern received by the receiver.

2. The data distribution method according to claim 1, wherein, the data transmission confirmation pattern is designated by one of the transmitter and the receiver.

3. The data distribution method according to claim 1, wherein, an available line to be used for the data distribution is selected by the transmitter; and the data distribution is performed from the transmitter to the receiver through the selected available line.

4. A data distribution apparatus for transmitting data between a transmitter and a receiver, comprising:

a transmission line device for receiving a distribution request of data in the transmitter, a memory device in the transmitter for storing the data, a control device in the transmitter for reading the data stored in the memory device and for controlling a data distribution operation to transmit the data to the receiver, a satellite transmission device for transmitting data controlled by the data distribution operation executed by the control device through radio waves, a satellite relay device for relaying the radio waves, a satellite receive device for receiving the radio waves, a control device in the receiver for receiving the radio waves received by the satellite receive device, a line device in the receiver, operatively connected to the line device in the transmitter, for transmitting a request and data to the transmitter, a data transmission confirmation designation device in the receiver for designating a data transmission confirmation pattern as the request; and a data transmission confirmation processing device in the receiver for receiving the content of the data transmission confirmation type and for performing a data transmission confirmation operation to the transmitter.

5. The data distribution apparatus according to claim 4, further comprising:

a data transmission confirmation designation device in the receiver for designating the data transmission confirmation pattern.

6. The data distribution apparatus according to claim 4, wherein, the data transmission confirmation processing device in the receiver transmits to the control device in the transmitter, a data transmission confirmation for a group of distribution data items which have been received during a predetermined constant time period counted from a time when the control device in the receiver receives the group of distribution data items transmitted from the transmitter, according to the distribution request by the transmitter or the receiver.

7. The data distribution apparatus according to claim 4, wherein, the data transmission confirmation processing device in the receiver transmits to the control device in the transmitter, a data transmission confirmation of the received data items as a random time in a predetermined time period counted after a time when the control device in the receiver receives the data items transmitted from the transmitter, according to the distribution request by the transmitter or the receiver.

8. The data distribution apparatus according to claim 4, wherein, the data transmission confirmation processing device in the receiver transmits to the control device in the transmitter, a data transmission confirmation after receiving a constant byte length of the received data items after a time when the control device in the receiver receives the data items transmitted from the transmitter, according to the distribution request by the transmitter or the receiver.

9. The data distribution apparatus according to claim 4, wherein, the data transmission confirmation processing device in the receiver transmits to the control device in the transmitter, a data transmission confirmation after receiving a predetermined constant number of files as the data items after a time when the control device in the receiver receives the data items transmitted from the transmitter, according to the distribution request by the transmitter or the receiver.

10. The data distribution apparatus according to claim 4, wherein, the data transmission confirmation processing device in the receiver receives a transmission time of the data transmission confirmation indicated by the control device in the transmitter, and transmits the data transmission confirmation of the data at the indicated transmission time to the control device in the transmitter according to the distribution request by the transmitter or the receiver.

11. The data distribution apparatus according to claim 4, wherein, the data transmission confirmation processing device in the receiver receives, through the control device in the receiver, information of a data transmission confirmation sending device to indicate a device for transmitting the data transmission confirmation that is designated by the data transmission confirmation designation device in the transmitter or in the receiver and then received by the data transmission confirmation designation device in the transmitter, and the data transmission confirmation processing device in the receiver transmits an information of the designated data transmission confirmation sending device.

12. The data distribution apparatus according to claim 4, wherein, the control device in the transmitter is capable of designating a transmission stage to transmit the data transmission confirmation or is capable of transmitting information designating a transmission stage to transmit the data transmission confirmation to the control device in the receiver, and the control device in the receiver is capable of receiving information indicating the transmission stage, and is capable of transmitting a data transmission confirmation sending instruction based on the received information to the control device in the receiver or to another receive device connected through a Local Area Network in the receiver.

13. The data distribution apparatus according to claim 4, further comprising:

a router device in the transmitter for connecting the control device in the transmitter and the satellite transmission device and for transferring data transferred from the control device in the transmitter to the satellite transmission device, a router device in the receiver for connecting the satellite receive device to the control device in the receiver and for transmitting received data to the control device in the receiver, wherein the distribution request transferred from the control device in the receiver is transmitted to the line device in the transmitter through the line device in the receiver, and the control device in the transmitter receives the distribution request for reading the data stored in the memory device in the transmitter, and for transmitting the distribution data to the router devices in the transmitter and the receiver according to the distribution request.

14. The data distribution apparatus according to claim 4, further comprising:

an available line selection device in the transmitter for checking a volume or a size of data to be transmitted and for selecting one of the wire line and the satellite line automatically according to the volume or the size of the data.

15. The data distribution apparatus according to claim 14, wherein, the available line selection device is capable of checking a state of a current line during transmitting of the data from the control device in the transmitter or the receiver, for switching the current line through which the data is executing to another available line, for transmitting information about the switched line to the control device in the receiver, and the control device in the receiver is capable of receiving information about a change of the switched line, and for switching a data receiving line according to the received information about the change of the switched line.

16. The data distribution apparatus according to claim 14, further comprising:

a router device in the transmitter for connecting the control device in the transmitter and the satellite transmission device and for transferring data transferred from the control device in the transmitter to the satellite transmission device; and a router device in the receiver for connecting the satellite receive device to the control device in the receiver and for transmitting the received data to the control device in the receiver.

17. The data distribution apparatus according to claim 4, further comprising:

a transmission type designation device in the transmitter for receiving data and for selecting one of the following distribution methods, a plurality of data items according to the distribution request and other distribution requests are grouped and the grouped data items are transmitted at a time to the receiver; and the data is transmitted to the receiver after receiving each distribution request.

18. The data distribution apparatus according to claim 17, wherein, the transmission type designation device in the transmitted is capable of receiving information about a packet transmission success/failure transmitted from the receiver, capable of storing a failure packet number about the packet in the transmission failure, capable of detecting a completion of the packet transmission and of re-transmitting packets in a transmission failure, and the control device in the receiver is capable of receiving a failure packet transmitted from the transmitter and capable of generating a file based on a received re-transmitted failure packet, and the transmission type designation device in the transmitter groups a plurality of failure packets and re-transmits them after completion of a normal packet transmission.

19. The data distribution apparatus according to claim 17, further comprising:

a router device in the transmitter for connecting the control device in the transmitter and the satellite transmission device and for transferring data transferred from the control device in the transmitter to the satellite transmission device: and a router device in the receiver for connecting the satellite receive device to the control device in the receiver and for transmitting a received data to the control device in the receiver.

20. The data distribution method according to claim 1, wherein the transmitter receives a plurality of data distribution requests and selects whether to respond to each data distribution request individually or to respond to a plurality of data distribution requests by successively transmitting a plurality of requested data packets.

\* \* \* \* \*